United States Patent [19]
Hirokane et al.

[11] Patent Number: 5,955,191
[45] Date of Patent: Sep. 21, 1999

[54] MAGNETO-OPTICAL RECORDING MEDIUM AND A REPRODUCING METHOD USING SUCH A MEDIUM

[75] Inventors: Junji Hirokane, Nara; Yoshiteru Murakami, Nishinomiya; Akira Takahashi, Nara, all of Japan

[73] Assignee: Sharp Kabushiki Kaisha, Osaka, Japan

[21] Appl. No.: 08/898,270

[22] Filed: Jul. 22, 1997

[30] Foreign Application Priority Data

Jul. 30, 1996 [JP] Japan ..................................... 8-200014

[51] Int. Cl.⁶ ....................................................... G11B 5/66
[52] U.S. Cl. .................. 428/332; 428/336; 428/694 ML; 428/694 MT; 428/694 RE; 428/694 MM; 428/694 EC; 428/900; 369/13; 369/14; 369/275.2; 369/275.3; 365/122; 360/59; 360/114; 360/131
[58] Field of Search ..................... 428/694 ML, 694 MT, 428/694 RE, 694 MM, 694 EC, 900, 332, 336; 369/13, 14, 275.2, 275.3; 360/59, 114, 131; 365/122

[56] References Cited

FOREIGN PATENT DOCUMENTS

| | | |
|---|---|---|
| 0352548 | 1/1990 | European Pat. Off. . |
| 0 596 716 A2 | 5/1994 | European Pat. Off. . |
| 0 604 065 A2 | 6/1994 | European Pat. Off. . |
| 0 668 586 A2 | 8/1995 | European Pat. Off. . |
| 0 810 594 A2 | 12/1997 | European Pat. Off. . |

OTHER PUBLICATIONS

K. Tamanoi, et al. "Magnetically–Induced Super Resolution Using Magneto–Static Coupling." Digest of papers presented at Moris '94, Sep. 27–29, 1994, Tokyo, Japan; 29–K–05, p. 126.

Nishimura N. et al: "Transition from In–plane to perpendicular magnetization in MSR Magneto–Optical Disks"; Journal of Applied Physics, vol. 79, No. 8, Part 02B, Apr. 15, 1996, pp. 5683–5685.

Tamanoi K. et al: "Magnetically–Induced Super Resolution Using Magneto–Static Coupling"; Nihon Oyo Jiki Gakkaishi—Journal of the Magnetic Society of Japan, vol. 19, Sep. 27, 1995, pp. 421–424.

*Primary Examiner*—Leszek Kiliman
*Attorney, Agent, or Firm*—David G. Conlin; William J. Daley, Jr.

[57] ABSTRACT

A super-resolution magneto-optical recording medium has a reproducing layer, an in-plane magnetization layer and a recording layer. The reproducing layer and the recording layer are magnetostatically coupled, and each of the layers is made of a rare-earth transition-metal alloy which has a greater transition-metal sublattice moment than the compensation composition, and exhibits perpendicular magnetization, if it exists alone. At a temperature not more than the Curie temperature, the in-plane magnetization layer is exchange-coupled with the reproducing layer so as to allow the reproducing layer to exhibit in-plane magnetization. Since the reproducing layer is allowed to exhibit in-plane magnetization by the in-plane magnetization layer, it is not necessary to use a material containing a greater rare-earth metal sublattice moment as the reproducing layer. Therefore, at portions in the in-plane magnetization layer having temperatures higher than the Curie temperature, the directions of the transition-metal sublattice moments of the reproducing layer and the recording layer are aligned in parallel with each other. Thus, the reproducing polarity of this medium becomes the same as the polarity of a magneto-optical recording medium without a reproducing layer, thereby allowing compatibility with each other.

25 Claims, 7 Drawing Sheets

⇧ TOTAL MAGNETIZATION

↑ DIRECTION OF TM SUBLATTICE MOMENT

↟ LEAKAGE MAGNETIC FIELD

↑ DIRECTION OF TM SUBLATTICE MOMENT
↑ LEAKAGE MAGNETIC FIELD

MAGNETO-OPTICAL RECORDING MEDIUM AND A REPRODUCING METHOD USING SUCH A MEDIUM

FIELD OF THE INVENTION

The present invention relates to a magneto-optical recording medium, such as a magneto-optical disk, a magneto-optical tape and a magneto-optical card, that is applied to a magneto-optical recording-reproduction apparatus, and also concerns a reproducing method of such a medium.

BACKGROUND OF THE INVENTION

Conventionally, a magneto-optical recording medium has been put into practical use as a re-writable optical recording medium. In such a magneto-optical recording medium, recording and reproducing operations are carried out by using a converged light beam released from a semiconductor laser. However, one of the disadvantages with the magneto-optical recording medium of this type is that when the diameter of a recording magnetic domain or the interval of the recording magnetic domain is smaller than the diameter of the light beam, the reproducing characteristic deteriorates.

This is caused by the fact that since a light beam, which is converged on a target recording magnetic domain, includes other recording magnetic domains adjacent to the recording magnetic domain in its beam diameter, individual recording magnetic domains are not reproduced in a separated manner.

Japanese Laid-Open Patent Publication No. 150418/1994 (Tokukaihei No. 6-150418) has proposed an arrangement for overcoming the above-mentioned disadvantage with the magneto-optical recording medium. In this arrangement, a reproducing layer, a non-magnetic intermediate layer and a recording layer are stacked in this order. The reproducing layer exhibits in-plane magnetization at room temperature and comes to exhibit perpendicular magnetization with temperature rises. Further, in this arrangement, the reproducing layer and the recording layer are magnetostatically coupled with the non-magnetic intermediate layer located in between, and a portion of the reproducing layer, which is in a perpendicular magnetization state, copies the magnetization of the recording magnetic layer. The other portion thereof, which is in an in-plane magnetization state, masks the magnetization of the recording layer. For this reason, in the recording layer, information in recording magnetic domains that are adjacent to a portion of the reproducing layer that is in the in-plane magnetization state is not reproduced. Therefore, even if recording magnetic domains that are to be reproduced and that are adjacent to the recording magnetic domains are included in the diameter of a light beam, individual recording magnetic domains are reproduced in a separated manner; that is, a magnetic super-resolution reproducing operation is available.

In the magneto-optical recording medium disclosed in the above-mentioned patent publication, it is necessary to use a rare-earth transition-metal alloy with a RErich (Rare Earth Metal Rich) composition at room temperature as a material for the reproducing layer. This alloy allows the reproducing layer to obtain the magnetic characteristic that exhibits in-plane magnetization at room temperature while exhibiting perpendicular magnetization with a temperature rise. With respect to the material for the recording layer, it is preferable to use a rare-earth transition-metal alloy with a TMrich (Transition Metal rich) composition in the vicinity of the Curie temperature.

Here, the RErich composition refers to a composition wherein as compared with the compensation composition of a rare-earth transition-metal alloy, the magnitude of the sublattice moment of the rare-earth metal (RE) is greater than that of the sublattice moment of the transition metal (TM). The compensation composition is a composition wherein the magnitude of the RE sublattice moment balances the magnitude of the TM sublattice moment in a rare-earth transition-metal alloy composition. In the same manner, the TMrich composition refers to a composition wherein the transition metal has a greater sublattice moment.

The resulting problem with the above-mentioned magneto-optical recording medium is that the reproducing polarity tends to be inverted, as compared with a magneto-optical recording medium without a reproducing layer. This is because the reproducing layer with the RErich composition and the recording layer with the TMrich composition are magnetostatically coupled so as to make the directions of the total magnetizations of both of the layers coincide with each other, and the directions of the TM sublattice moments of the reproducing layer and the recording layer are non-parallel to each other. For this reason, in order to allow the magneto-optical recording medium of the above-mentioned patent publication to be compatible with a magneto-optical recording medium without a reproducing layer, it is necessary to take the polarity inversion into consideration in providing recording and reproducing operations.

SUMMARY OF THE INVENTION

The objective of the present invention is to provide a magneto-optical recording medium which achieves a magnetic super-resolution reproducing operation without causing inversion in the reproducing polarity, and also to provide a reproducing method thereof.

In order to achieve the above-mentioned objective, the magneto-optical recording medium of the present invention is provided with a reproducing layer made of a perpendicular magnetization film, a recording layer that is made of a perpendicular magnetization film and that is magnetostatically coupled with the reproducing layer, and an in-plane magnetic layer that is placed between the reproducing layer and the recording layer and that changes the magnetization direction of the reproducing layer from the perpendicular direction to the in-plane direction with respect to the layer surface.

With the above-mentioned arrangement, the reproducing layer, which is originally in a perpendicular magnetization state, is allowed to exhibit in-plane magnetization by the in-plane magnetization layer. Therefore, it is not necessary to use a material that is originally in a perpendicular magnetization state in order to achieve the in-plane magnetization state of the reproducing layer. Consequently, in the same manner as the recording layer, it is possible to adopt a perpendicular magnetization film which contains a greater TM sublattice moment than the compensation composition as the reproducing layer. Therefore, it is possible to align the directions of the TM sublattice moment of the reproducing layer and the TM sublattice moment of the recording layer in parallel with each other at portions in the in-plane magnetization layer having temperatures not more than the Curie temperature. Thus, the reproducing polarity is allowed to be the same as the polarity of a magneto-optical recording medium without a reproducing layer, thereby allowing compatibility between the magneto-optical recording media of these two types.

For a fuller understanding of the nature and advantages of the invention, reference should be made to the ensuing detailed description taken in conjunction with the accompanying drawings.

DESCRIPTION OF THE EMBODIMENTS

[EMBODIMENT 1]

First, in order to explain a principle of reproducing operation used in a magneto-optical recording medium, the following description will discuss a conventional magnetic super-resolution reproducing operation that is given as a comparative example.

Figure 2:
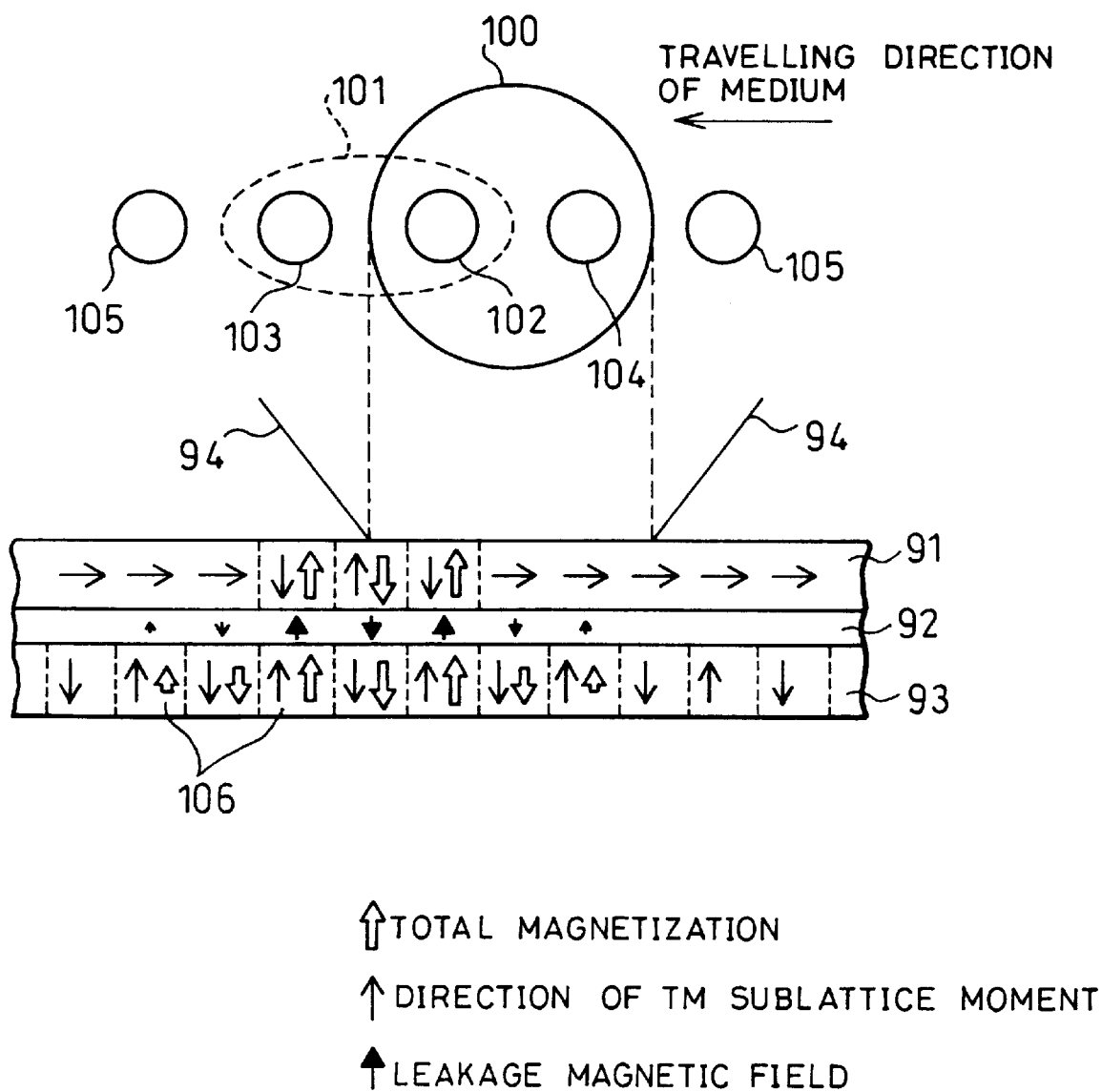
FIG. 2 is an explanatory drawing that shows a principle of reproducing used in a conventional magneto-optical recording medium.

FIG. 2 is an explanatory drawing that shows a reproducing state in a conventional super-resolution magneto-optical recording medium (hereinafter, referred to as a conventional medium). As illustrated in this Figure, the conventional medium has a reproducing layer 91, a non-magnetic intermediate layer 92 and a recording layer 93. The reproducing layer 91 is made of an alloy of a rare-earth metal and a transition metal. The reproducing layer 91 exhibits in-plane magnetization at room temperature and also comes to exhibit perpendicular magnetization as temperature rises.

Further, the recording layer 93 is made of an alloy of a rare-earth metal and a transition metal. This alloy has its compensation temperature at room temperature. The compensation temperature refers to a temperature at which the magnitude of the RE sublattice moment balances the magnitude of the TM sublattice moment so that the total magnetization becomes zero. Moreover, recording magnetic domains 106 are formed on the recording layer 93. In this Figure, the recording magnetic domains 106 are portions that are formed on the recording layer 93 and that have an upward TM sublattice moment. Portions of the recording layer 93 that have a downward TM sublattice moment are in an initialized state, and these portions are not recording magnetic domains. The fact that the portions of the recording layer having an upward TM sublattice moment are recording magnetic domains and that the portions thereof having a downward TM sublattice moment are not recording magnetic domains is also applied to all magnetic recording media that will be described later. Here, an alloy of a rare-earth metal and a transition metal is a ferrimagnetic material; and in the ferrimagnetic material, the direction of the TM sublattice moment always becomes antiparallel to the direction of the RE sublattice moment. Therefore, upon taking the polarity of reproducing into consideration, when the direction of the TM sublattice moment is determined, the direction of the RE sublattice moment is inevitably determined as well. For this reason, FIG. 2 only indicates the direction of the TM sublattice moment. Further, this is applied to FIGS. 1 through 6 in the same manner.

As illustrated in FIG. 2, magnetic domains 102 through 105, which correspond to the recording magnetic domains 106 of the recording layer 93, are also formed on the reproducing layer 91. Here, these two layers 91 and 93 are magnetostatically coupled with each other, with the non-magnetic intermediate layer 92 interpolated in between.

In the conventional medium, a light beam 94 is converged and directed from the reproducing layer 91 side so that information is reproduced. Upon irradiation by the light beam 94, a temperature distribution, which shows a Gaussian distribution corresponding to the intensity distribution of the light beam 94, is formed in the conventional medium. As illustrated in FIG. 2, the temperature distribution is formed in the conventional medium by the irradiation of the light beam 94, as indicated by an iso-thermal line 101. The inside of the iso-thermal line 101 represents a high-temperature portion. A leakage magnetic field from the recording layer 93 enters the high-temperature portion in the non-magnetic intermediate layer 92. The leakage magnetic layer is generated only from the portion of the recording layer 93 that has been subjected to the temperature rise.

Further, at this high-temperature portion, the corresponding portion of the reproducing layer 91 exhibits perpendicular magnetization, and allows the magnetization of the recording magnetic domains 106 of the recording layer 93 to be copied. Among the magnetic domains formed on the reproducing layer 91, the magnetic domains 102 and 103 represent magnetic domains at the high-temperature portion. Further, the outside of the isothermal line 101 on the reproducing layer 91 represents a low-temperature portion which exhibits in-plane magnetization so as to mask the recording magnetic domains 106 of the recording layer 93. The magnetic domains 104 and 105 in FIG. 2 represent magnetic domains at the low-temperature portion on the reproducing layer 91. Since the conventional medium is moving during a reproducing operation, the high-temperature portion is offset with respect to the beam spot 100 of the light beam 94. Although the above-mentioned magnetic domain 103 is one of the magnetic domains at the high-temperature portion on the reproducing layer 91, it is not reproduced because it is offset from the beam spot 100.

In the conventional medium having the above-mentioned temperature distribution, the low-temperature portion of the reproducing layer 91 serves so as to mask the magnetization of the recording layer 93. Further, at the high-temperature portion, the total magnetization of the reproducing layer 91 is aligned in the same direction as a leakage magnetic field that is generated from the recording layer 93. Therefore, only the perpendicular magnetization component at the high temperature portion in the reproducing layer 91 is reproduced as information so that a super-resolution reproducing operation is achieved.

Here, it is necessary for the reproducing layer 91 to contain a greater sublattice moment of the rare-earth metal (RE) as compared with the compensation composition at which the magnitude of the (RE) sublattice moment is the same as that of the sublattice moment of the transition metal (TM). This arrangement allows the reproducing layer 91 to acquire the property of exhibiting in-plane magnetization at room temperature and of exhibiting perpendicular magnetization as the temperature rises upon irradiation by the light beam 94. In this manner, since the ratio of the TM sublattice moment is less than that of the RE sublattice moment in the reproducing layer 91, the direction of the TM sublattice moment and the direction of the total magnetization of the reproducing layer 91 are antiparallel to each other.

With respect to the recording layer 93, a rare-earth transition-metal alloy having its compensation temperature at room temperature is used in order to obtain a good recording characteristic. This alloy provides a greater TM sublattice moment than a RE sublattice moment during a temperature-increasing process. For this reason, in the recording layer 93, the direction of the TM sublattice moment and the direction of the total magnetization are parallel to each other.

Thus, at the magnetic domains 103 and 102 in the high-temperature portion of the reproducing layer 91, the direction of the TM sublattice moment is aligned to be antiparallel to the leakage magnetic field from the recording layer 93. Therefore, in the conventional medium, the reproducing polarity, that is, the direction of the TM sublattice moment, is also inverted, as compared with a magneto-optical recording medium that has no reproducing layer and that carries out reproducing directly from the recording layer. Consequently, in order to allow the conventional medium to be compatible with a magneto-optical recording medium without a reproducing layer, it is necessary to take the polarity inversion into consideration in providing recording and reproducing operations.

Figure 1:
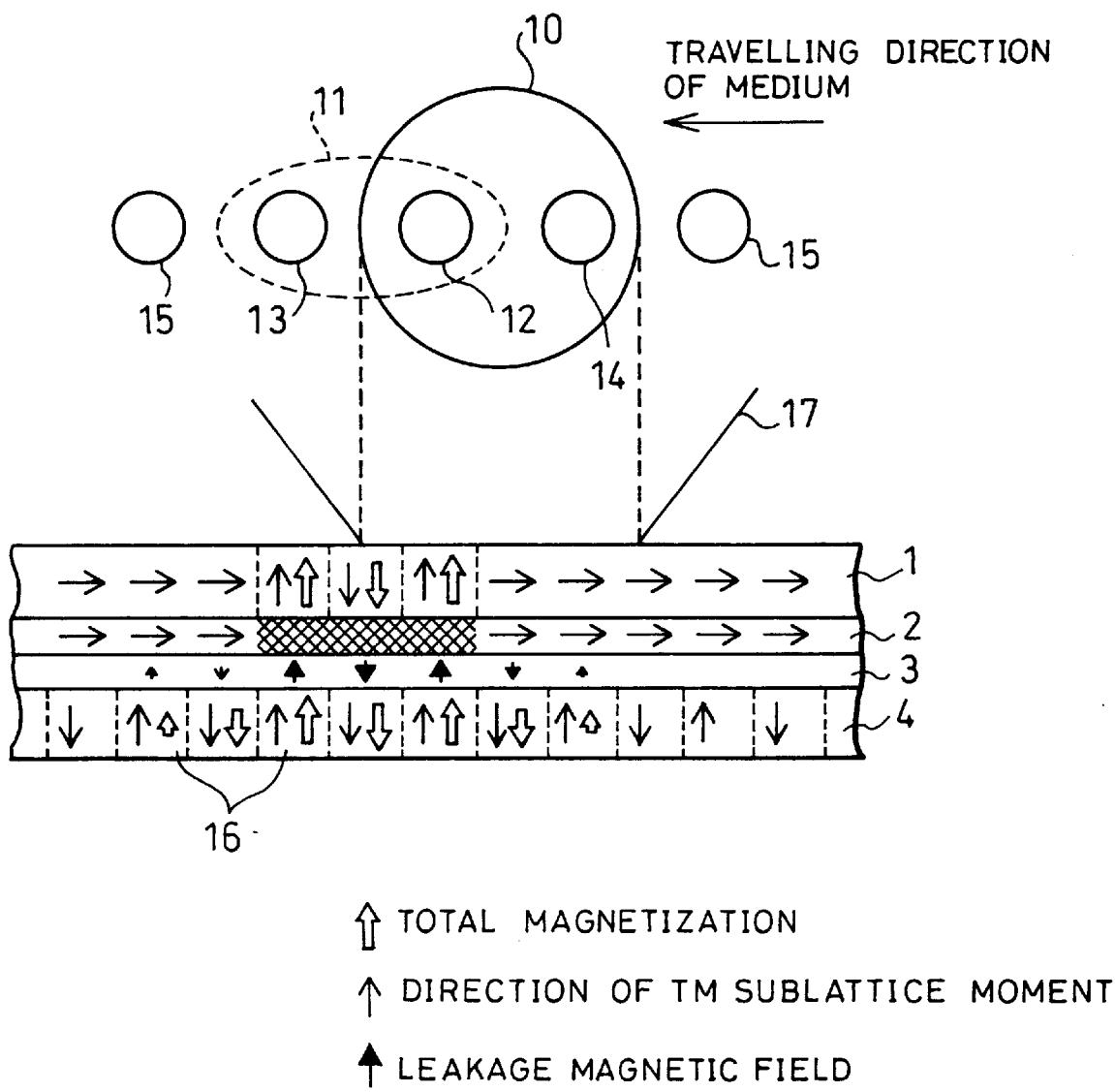
FIG. 1 is an explanatory drawing that shows a principle of reproducing used in a magneto-optical recording medium of Embodiment 1.

Next, an explanation will be given of a principle of reproducing operation used in a super-resolution magneto-optical recording medium in accordance with the present embodiment (hereinafter, referred to as the present magneto-optical recording medium). FIG. 1 is an explanatory drawing that shows a reproducing state in the present magneto-optical recording medium. As illustrated in this Figure, the present magneto-optical recording medium has a reproducing layer 1, an in-plane magnetization layer 2, a non-magnetic intermediate layer 3 and a recording layer 4. The non-magnetic intermediate layer 3 and the recording layer 4 have the same constructions as the aforementioned non-magnetic intermediate layer 92 and the recording layer 93.

The in-plane magnetization layer 2 has such a function that at temperatures not more than the Curie temperature, it is exchange-coupled with the reproducing layer 1 so as to allow the reproducing layer 1 to exhibit in-plane magnetization. The reproducing layer 1 is made of a rare-earth transition-metal alloy that contains a greater TM sublattice moment as compared with the compensation composition, and exhibits perpendicular magnetization if it exists alone.

As illustrated in FIG. 1, when a light beam 17 is converged and directed to the present magneto-optical recording medium from the reproducing layer 1 side, a temperature distribution in the shape of a Gaussian distribution is formed in the same manner as the conventional medium. Thus, the temperature distribution as indicated by an iso-thermal line 11 is formed in the present magneto-optical recording medium. The inside of the iso-thermal line 11 represents a high-temperature portion. Here, at the high-temperature portion, the in-plane magnetization layer 2 has a temperature exceeding the Curie temperature thereof. Therefore, the reproducing layer 1 at the high-temperature portion comes to exhibit perpendicular magnetization which is the original magnetization state so that the magnetization of recording magnetic domains 16 at the high-temperature portion is copied by a magnetostatic coupling with the recording layer 3. Among the magnetic domains 12 through 15 formed in the reproducing layer 1, the magnetic domains 13 and 12 are contained in the high-temperature portion.

Further, the outside of the iso-thermal line 11 on the reproducing layer 1 represents a low-temperature portion (the first mask) which is allowed to exhibit in-plane magnetization by the in-plane magnetization layer 2 so that the recording magnetic domains 16 of the recording layer 3 are masked at this portion. The magnetic domains 14 and 15 in FIG. 1 represent magnetic domains at the low-temperature portion on the reproducing layer 1.

In the same manner as the conventional medium, during a reproducing operation, the high-temperature portion is offset from the beam spot 10 of the light beam 17. Therefore, among the magnetic domains on the reproducing layer 1, only the magnetic domain 12 is reproduced so that a super-resolution reproducing operation is achieved in the present magneto-optical recording medium.

As described above, the reproducing layer 1 of the present magneto-optical recording medium is allowed to exhibit in-plane magnetization by the in-plane magnetization layer 2; therefore, unlike the conventional medium as shown in FIG. 2, it is not necessary to use a rare-earth transition-metal alloy containing a greater RE sublattice moment as its material. For this reason, it is possible to adopt a perpendicular magnetization film containing a greater TM sublattice moment as compared with the compensation composition, as the reproducing layer 1. Consequently, it becomes possible to align the direction of the TM sublattice moment of the reproducing layer 1 and the direction of the TM sublattice moment of the recording layer 4 in parallel with each other. Thus, the reproducing polarity of the present magneto-optical recording medium has the same polarity as a magneto-optical recording medium without a reproducing layer, thereby readily allowing compatibility between the magneto-optical recording media of these two types.

The following description will discuss a magneto-optical disk (hereinafter, referred to as the present magneto-optical disk) that is an example of the present magneto-optical recording medium.

Figure 3:
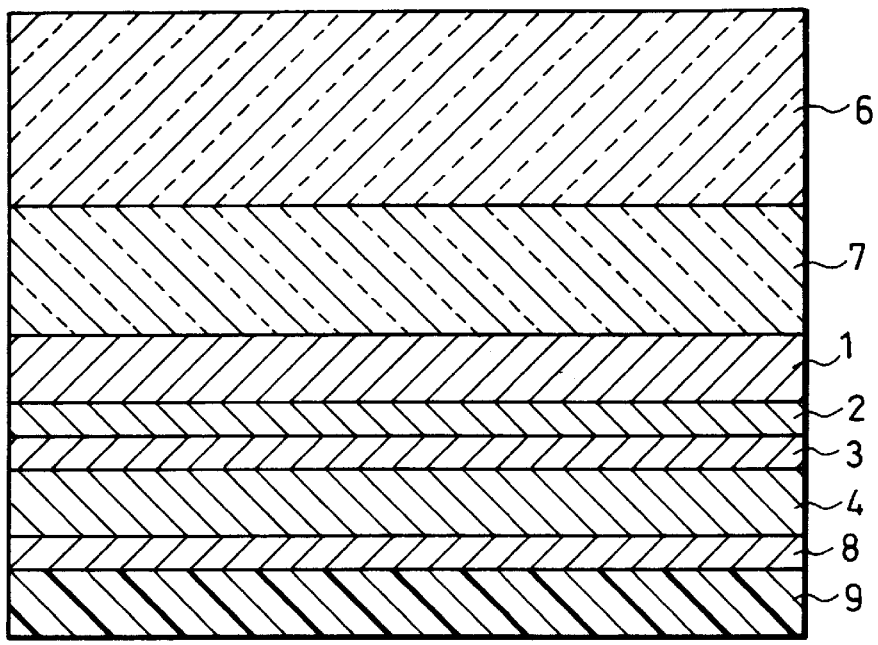
FIG. 3 is a cross-sectional view that schematically shows a construction of the magneto-optical disk of Embodiment 1.

FIG. 3 is a cross-sectional view that shows a construction of the present magneto-optical disk. As illustrated in this Figure, the present magneto-optical disk is constituted by a transparent dielectric layer 7, a reproducing layer 1, an in-plane magnetization layer 2, a non-magnetic intermediate layer 3, a recording layer 4, a protective layer 8 and an overcoat layer 9 that are stacked on a substrate 6 in this order.

In the present magneto-optical disk, the Curie temperature recording method is adopted as its recording method. In this method, a light beam, released from a semiconductor laser, is converged onto the reproducing layer 1 by an objective lens. Then, information is recorded and reproduced by a magneto-optical effect that is known as the polar Kerr effect. The polar Kerr effect refers to a phenomenon in which the direction of rotatory polarization in reflected light is reversed by magnetization that is aligned in the normal direction to the incident surface of a light beam.

The substrate 6, which is made of a transparent base material such as polycarbonate, is formed into a disk shape. The transparent dielectric layer 7 is preferably made from a material without containing oxygen, such as AlN, SiN and AlSiN. Further, the film thickness of the transparent dielectric layer 7 needs to be set so as to achieve a good interference effect with respect to an incident laser light beam and to increase the Kerr rotation angle. For this reason, supposing that the wavelength of reproducing light is $\lambda$ and that the refractive index of the transparent dielectric layer 7 is n, the film thickness of the transparent dielectric layer 7 needs to be set to approximately $\lambda/(4n)$. For example, in the case when the wavelength of laser beam is 680 nm, the film thickness of the transparent dielectric layer 7 is preferably set in the range of 40 nm to 100 nm.

The reproducing layer 1 is a magnetic layer made of a rare-earth transition-metal alloy. The composition of the reproducing layer 1 is set so as to contain a greater TM sublattice moment than the compensation composition. This arrangement is intended to prevent inversion of the reproducing polarity in the present magneto-optical disk from room temperature to the Curie temperature. Further, the reproducing layer 1 exhibits perpendicular magnetization with respect to the film surface when it exists alone. Moreover, the film thickness of the reproducing layer 1 is preferably set in the range of 10 nm to 80 nm in order to obtain a good reproducing signal.

The in-plane magnetization layer 2 exhibits in-plane magnetization up to the Curie temperature. Further, it has the characteristic of changing the magnetization direction of the reproducing layer 1 from a perpendicular direction to an in-plane direction through an exchange-coupling with the reproducing layer 1. Further, the Curie temperature of the in-plane magnetization layer 2 is preferably set at a temperature from not less than 60° C. to not more than 220° C. This arrangement is intended to provide a good in-plane magnetization mask in the reproducing layer 1 upon exchange-coupling with the reproducing layer 1. Moreover, the film thickness of the in-plane magnetization layer 2 is preferably set in the range of 2 nm to 80 nm in order to obtain a good reproducing signal.

The non-magnetic intermediate layer 3 is made of a dielectric material such as AlN, SiN and AlSiN, or a non-magnetic metal alloy made of elements such as Al, Ti and Ta. The film thickness of the non-magnetic intermediate layer 3 is set in the range of 1 nm to 80 nm so that the reproducing layer 1 and the recording layer 4 are magnetostatically coupled in a preferable manner. The recording layer 4 is made of a perpendicular magnetization film of a rare-earth transition-metal alloy. The film thickness of the recording layer 4 is set in the range of 15 nm to 180 nm so that a leakage magnetic field with a sufficient magnitude is exerted on the reproducing layer 1.

The protective layer 8 is made of a dielectric material such as AlN, SiN and AlSiN, or a non-magnetic metal alloy made of elements such as Al, Ti and Ta. The protective layer 8 is formed so as to prevent the rare-earth transition-metal alloys used in the reproducing layer 1 and the recording layer 4 from oxidation. The film thickness of the protective layer 8 is set in the range of 5 nm to 60 nm.

The overcoat layer 9 is formed by applying ultraviolet-ray-setting resin or thermosetting resin through a spinner coating method and irradiating it with ultraviolet rays or applying heat to it.

(1) Formation Method of the Present Magneto-optical Disk

The following description will discuss a formation method of the present magneto-optical disk with the above-mentioned arrangement. The following formation method is one example of the formation method of the present magneto-optical disk. The present magneto-optical disk formed in this example is referred to as sample #1.

In a sputtering device having an Al target, a GdFeCo alloy target, a GdFeAl alloy target and a DyFeCo alloy target, a polycarbonate substrate 6, which has pregrooves and prepits and which is formed into a disk shape, was placed on a substrate holder. After the sputtering device had been evacuated to $1\times10^{-6}$ Torr, a mixed gas of argon and nitrogen was introduced thereto, and electric power was supplied to the Al target so that a transparent dielectric layer 7, made of AlN, was formed on the substrate 6 with a film thickness of 80 nm under a gas-pressure condition of $4\times10^{-3}$ Torr.

Next, after the sputtering device had been again evacuated to $1\times10^{-6}$ Torr, argon gas was introduced thereto, and electric power was supplied to the GdFeCo alloy target under a gas pressure of $4\times10^{-3}$ Torr so that a reproducing layer 1, made of $Gd_{0.20}(Fe_{0.84}CO_{0.16})_{0.80}$, was formed on the transparent dielectric layer 7 with a film thickness of 40 nm. The composition of the reproducing layer 1 was set so that it contains a greater TM sublattice moment than a RE sublattice moment at room temperature as compared with the compensation composition. Further, the reproducing layer 1 always exhibits perpendicular magnetization from room temperature to the Curie temperature (300° C.), if it exists alone.

Next, electric power was supplied to the GdFeAl target so that an in-plane magnetization layer 2, made of $(Gd_{0.10}Fe_{0.90})_{0.75}Al_{0.25}$, was formed on the reproducing layer 1 with a film thickness of 20 nm under a gas pressure of $4\times10^{-3}$ Torr. The in-plane magnetization film 2 exhibits in-plane magnetization from room temperature to the Curie temperature (140° C.).

Successively, a mixed gas of argon and nitrogen was introduced thereto, and electric power was supplied to the Al target so that a non-magnetic intermediate layer 3, made of AlN, was formed on the in-plane magnetization layer 2 with a film thickness of 5 nm under a gas-pressure condition of $4\times10^{-3}$ Torr.

Next, after the sputtering device had been again evacuated to $1\times10^{-6}$ Torr, argon gas was introduced thereto, and electric power was supplied to the DyFeCo alloy target under a gas pressure of $4\times10^{-3}$ Torr so that a recording layer 4, made of $Dy_{0.23}(Fe_{0.72}Co_{0.28})_{0.77}$ was formed on the non-magnetic intermediate layer 3 with a film thickness of 40 nm. The recording layer 4 has its compensation temperature at 25° C. and its Curie temperature at 275° C.

Successively, a mixed gas of argon and nitrogen was introduced thereto, and electric power was supplied to the Al target so that a protective layer 8, made of AlN, was formed on the recording layer 4 with a film thickness of 20 nm under a gas-pressure condition of $4\times10^{-3}$ Torr.

Next, ultraviolet-ray setting resin was applied to the protective layer 8 by a spinner coating method, and an overcoat layer 9 was formed by irradiation with ultraviolet rays.

Thus, sample #1 of the present magneto-optical disk was formed.

(2) Recording and Reproducing Characteristics

With respect to sample #1 formed by the above-mentioned formation method (1), the mark-length dependence was measured on CNR (carrier-to-noise ratio). The measurements were carried out by using an optical pickup having a semiconductor laser with a wavelength of 680 nm. At this time, the laser power was set at 2.5 mW. The results of the measurements are shown in FIG. 4.

Figure 4:
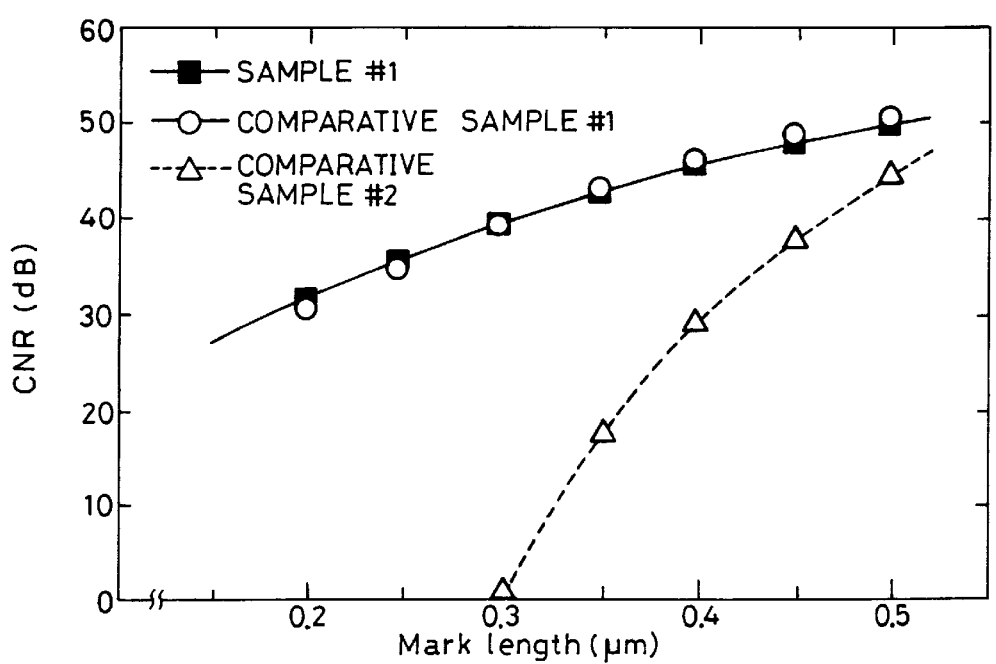
FIG. 4 is a graph that shows the mark-length dependence of CNR in the magneto-optical disk shown in FIG. 3 and the conventional magneto-optical disk.

For comparative purposes, FIG. 4 also shows the results of the measurements on comparative samples #1 and #2.

This comparative sample #1 has a construction in which GdFeCo having the following magnetic characteristics is used as the reproducing layer 1 in the conventional magneto-optical recording medium shown in FIG. 2. The above-mentioned GdFeCo exhibits in-plane magnetization at room temperature, comes to exhibit perpendicular magnetization at 120° C., and has its Curie temperature at 320° C. In other words, comparative sample #1 is constituted by a transparent dielectric layer made of AlN with a thickness of 80 nm, a reproducing layer made of $Gd_{0.30}(Fe_{0.75}Co_{0.25})_{0.70}$ with a thickness of 40 nm, an in-plane magnetization layer made of $(Gd_{0.10}Fe_{0.90})_{0.75}Al_{0.25}$ with a thickness of 20 nm, a non-magnetic intermediate layer made of AlN with a thickness of 5 nm, a recording layer made of $Dy_{0.23}(Fe_{0.72}Co_{0.28})_{0.77}$ with a thickness of 40 nm, a protective layer made of AlN with a thickness of 20 nm and an overcoat layer made of ultraviolet-ray setting resin all of which are stacked in this order on a substrate made of polycarbonate.

Further, comparative sample #2 is a commercial magneto-optical disk having only a recording layer without a reproducing layer. In other words, comparative sample #2 is constituted by a transparent dielectric layer made of AlN with a thickness of 80 nm, a recording layer made of $Dy_{0.23}(Fe_{0.72}Co_{0.28})_{0.77}$ with a thickness of 25 nm, a transparent dielectric layer made of AlN with a thickness of 20 nm, a reflection layer made of Al with a thickness of 40 nm and an overcoat layer made of ultraviolet-ray setting resin all of which are stacked in this order on a substrate made of polycarbonate.

Moreover, the mark-length dependence of CNR shown in this Figure represents the carrier-to-noise ratio that is obtained as follows: Recording magnetic domains, each having a length corresponding to a mark length, are continuously formed with recording-magnetic-domain pitches each of which is double the mark length, and the carrier-to-noise ratio is obtained by reproducing these recording magnetic domains.

As shown in this Figure, the CNR of comparative sample #2 is zero in the case of a mark length of 0.3 μm. This is due to the fact that a plurality of adjacent recording magnetic domains are located within one light beam on the reproducing layer, making it impossible to reproduce the recording magnetic domains one by one in a separated manner.

In contrast, it is found that the CNR of sample #1 has the same level of CNR as that of comparative sample #1. This means that in sample #1, the same in-plane magnetization mask as the comparative sample #1 is formed so that a magnetic super-resolution reproducing operation has been achieved.

Figure 5:
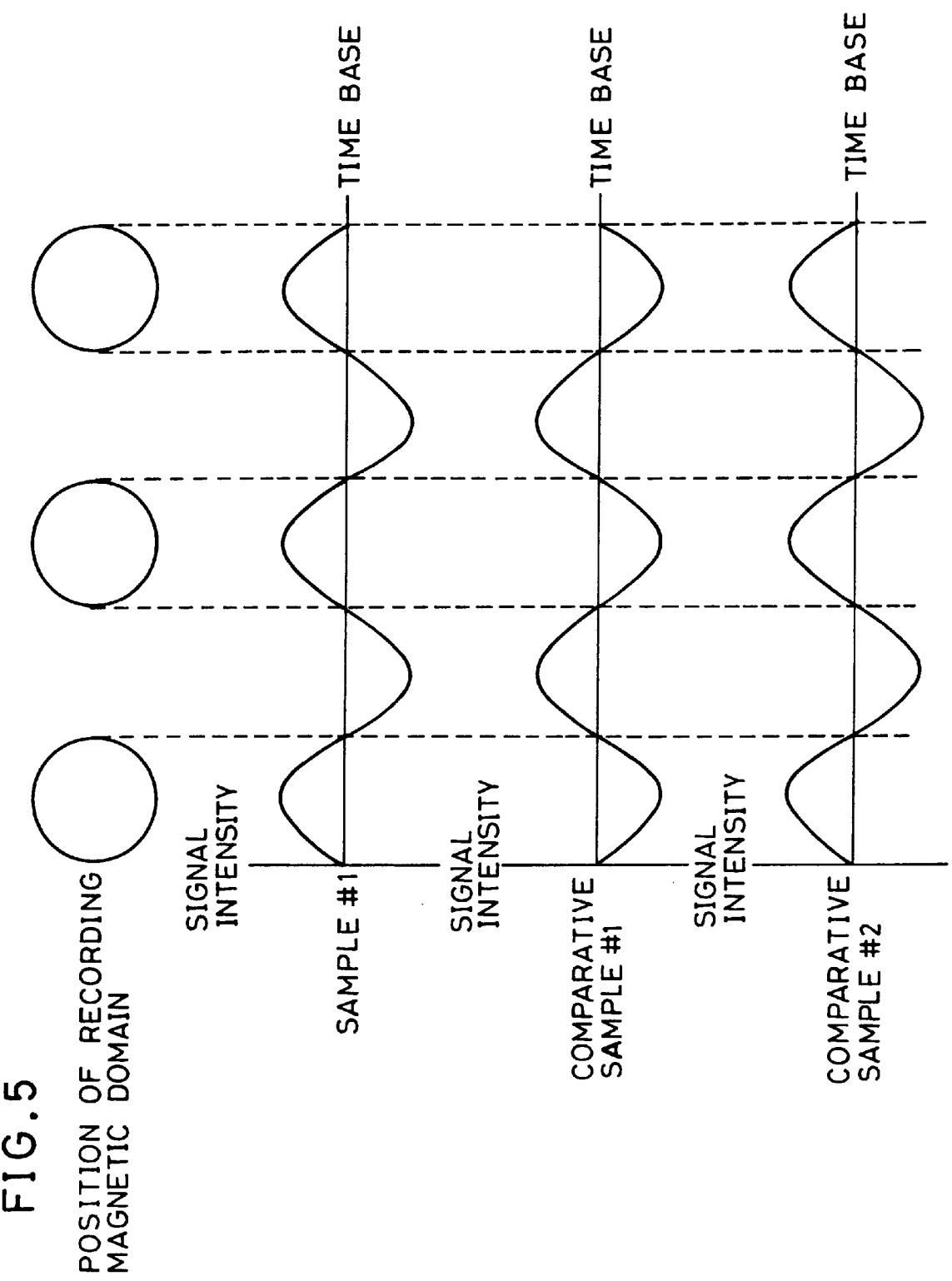
FIG. 5 is an explanatory drawing that shows reproducing-signal waveforms of the magneto-optical disk shown in FIG. 3 and the conventional magneto-optical disk.

FIG. 5 is an explanatory drawing that shows reproducing signal waveforms of the respective samples in the case of a mark length of 0.5 μm. The intensity of each reproducing signal varies depending on the position of the recording magnetic domain in question. As shown in this Figure, the signal intensity of sample #1 varies with that of sample #2 that has no reproducing layer with the same phase. In contrast, the signal intensity of the comparative sample #1 varies with that of sample #2 with the inverted phase. In this way, different from comparative sample #1, the present magneto-optical disk has no inverted phase in its reproducing signal in relation to the magneto-optical disk without a reproducing layer. Therefore, it is possible to obtain a reproducing signal that readily allows compatibility with the magneto-optical disk of this type.

Table 1 shows the results of CNR measurements in the case when the film thickness of the reproducing layer 1 is varied in sample #1 with a mark length of 0.4 μm. In these measurements, with respect to individual samples #1 each of which has a reproducing layer 1 having a different film thickness, recording is carried out with varied recording conditions so that the CNR has a maximum value when the reproducing power is set at 2.5 mW.

TABLE 1

| Film Thickness of Reproducing Layer (nm) | CNR (dB) |
| --- | --- |
| 8 | 29.0 |
| 10 | 34.5 |
| 20 | 40.0 |
| 40 | 46.0 |
| 60 | 43.0 |
| 80 | 37.0 |
| 100 | 28.0 |

In the case of a mark length of 0.4 μm, the CNR of comparative sample #2 is 29.5 dB. Therefore, as shown in Table 1, the CNR of sample #1 is higher than that of comparative sample #2 in the range from not less than 10 nm to not more than 80 nm in the film thickness of the reproducing layer 1.

In the arrangement of sample #1, when the film thickness of the reproducing layer 1 is made thinner, most of the light beam, which has been directed thereto, passes through the producing layer 1, resulting in a decrease in the amount of light that is to be involved in a super-resolution reproducing operation. Further, the magnetostatic coupling force that is exerted between the reproducing layer 1 and the recording layer 4 is directly proportional to the film thickness of the reproducing layer 1. Therefore, in the case when the reproducing layer 1 is thin, the magnetostatic coupling force becomes extremely small, making it impossible to obtain a sufficient magnetostatic coupling force required for reproducing.

For the reasons as described above, when the film thickness of the reproducing layer 1 is set at a thin level of 8 nm in sample #1, the CNR of sample #1 becomes lower than that of comparative sample #2.

Moreover, when the film thickness of the reproducing layer 1 is set at a thick level of 100 nm in sample #1, the reproducing layer 1 has a greater force that tries to attain a perpendicularly magnetized state, which was its original magnetized state. Consequently, the portion, which is supposed to have in-plane magnetization due to an exchange coupling with the in-plane magnetization layer 2, that is, the portion having no temperature rise, is made to exhibit perpendicular magnetization. Therefore, a good super-resolution reproducing operation is not obtained and the CNR of sample #1 is lower than comparative sample #2.

For the reasons as described above, it is required that the film thickness of the reproducing layer 1 be set from not less than 10 nm to not more than 80 nm.

Next, Table 2 shows the results of CNR measurements in the case when the film thickness of the in-plane magnetization layer 2 is varied in sample #1 with a mark length of 4 μm. In these measurements, with respect to individual samples in sample #1 each of which has an in-plane magnetization layer 1 having a different film thickness, recording is carried out with varied recording conditions so that the CNR has a maximum value when the reproducing power is set at 2.5 mW.

TABLE 2

| Film Thickness of In-Plane Magnetic Layer (nm) | CNR (dB) |
| --- | --- |
| 1 | 27.5 |
| 2 | 38.5 |
| 5 | 40.5 |
| 10 | 45.0 |
| 20 | 46.0 |
| 40 | 45.5 |
| 60 | 40.5 |
| 80 | 35.0 |
| 100 | 27.0 |

As shown in FIG. 2, when the film thickness of the in-plane magnetization layer 2 is 1 nm, the value of CNR is 27.5 dB, which is lower than the value of CNR in comparative sample #2. This is due to the fact that since the film thickness of the in-plane magnetization layer 2 is too thin, the reproducing layer 1 is not allowed to have in-plane magnetization. The magnetization of the reproducing layer 1, which originally exhibits in-plane magnetization, is made to exhibit perpendicular magnetization due to an exchange coupling with the in-plane magnetization layer 2. Therefore, in order to allow the reproducing layer to have in-plane magnetization and also to achieve a super-resolution reproducing operation, it is required that the film thickness of the in-plane magnetization layer 2 be set not less than 2 nm.

Further, in the case of a film thickness of 100 nm in the in-plane magnetization layer 2, the CNR of sample #1 becomes lower than that of comparative sample #2. This is due to the fact that the magnetostatic coupling force exerted between the reproducing layer 1 and the recording layer 4 decreases as the film thickness of the in-plane magnetization layer 2 becomes thicker. For this reason, when the film thickness of the in-plane magnetization layer 2 is set at a thick level of 100 nm, it is impossible to obtain a magnetostatic coupling force with a sufficient magnitude, thereby causing the CNR of sample #1 to become lower than that of comparative sample #2.

For the reasons as described above, it is required that the film thickness of the in-plane magnetization layer 2 be set from not less than 2 nm to not more than 80 nm.

Table 3 shows the results of CNR measurements in the case when the film thickness of the non-magnetic intermediate layer 3 is varied in sample #1 with a mark length of 4 μm. In these measurements, with respect to individual samples in sample #1 each of which has a non-magnetic intermediate layer 3 having a different film thickness, recording is carried out with varied recording conditions so that the CNR has a maximum value when the reproducing power is set at 2.5 mW.

TABLE 3

| Film Thickness of Non-magnetic Intermediate Layer (nm) | CNR (dB) |
| --- | --- |
| 0.5 | 25.0 |
| 1 | 44.0 |
| 5 | 46.0 |
| 10 | 46.0 |
| 20 | 46.0 |
| 40 | 44.5 |
| 60 | 42.5 |
| 80 | 37.0 |
| 100 | 28.5 |

As shown in FIG. 3, when the film thickness of the non-magnetic intermediate layer 3 is 0.5 nm, the value of CNR in sample #1 is 25.0 dB, which is lower than the value of CNR (29.5 dB) in comparative sample #2. This is supposedly due to the fact that since the film thickness of the non-magnetic intermediate layer 3 is too thin, it is not possible to obtain a good magnetostatic coupling state between the reproducing layer 1 and the recording layer 4. Consequently, it is required that the film thickness of the non-magnetic intermediate layer 3 be set not less than 1 nm in order to obtain a good magnetostatic coupling state.

Further, in the case of a film thickness of 100 nm in the non-magnetic intermediate layer 3, the CNR of sample #1 becomes lower than that of comparative sample #2. Since the magnetostatic coupling force exerted between the reproducing layer 1 and the recording layer 4 decreases as the film thickness of the non-magnetic intermediate layer 3 becomes thicker. For this reason, when the film thickness of the non-magnetic intermediate layer 3 is set at a thick level of 100 nm, it is impossible to obtain a magnetostatic coupling force with a sufficient magnitude, thereby causing the CNR of sample #1 to become lower than that of comparative sample #2.

For the reasons as described above, it is required that the film thickness of the non-magnetic intermediate layer 4 be set from not less than 1 nm to not more than 80 nm.

Table 4 shows the results of CNR measurements in the case when the film thickness of the recording layer 3 is varied in sample #1 with a mark length of 0.4 μm. In these measurements, with respect to individual samples in sample #1 each of which has a recording layer 4 having a different film thickness, recording is carried out with varied recording conditions so that the CNR has a maximum value when the reproducing power is set at 2.5 mW.

TABLE 4

| Film Thickness of Recording Layer (nm) | CNR (dB) |
| --- | --- |
| 10 | 27.0 |
| 15 | 32.0 |
| 20 | 40.0 |
| 40 | 46.0 |
| 80 | 46.0 |
| 120 | 45.0 |
| 160 | 42.5 |
| 180 | 37.0 |
| 200 | 29.0 |

As shown in FIG. 4, when the film thickness of the recording layer 4 is set a thin level of 10 nm, the CNR of sample #1 is lower than that of comparative sample #2. This is due to the fact that when the film thickness of the recording layer 4 is thin, a leakage magnetic field that is generated from the recording layer 4 becomes smaller, thereby failing to provide a magnetostatic coupling force with a sufficient magnitude.

Further, even when the film thickness of the recording layer 4 is set at a thick level of 200 nm, the CNR of sample

1 is lower than that of comparative sample #2. This is due to the fact that the recording layer 4 has too great a leakage magnetic field. When the leakage magnetic field from the recording layer 4 is great, the portion of the reproducing layer 1, which is supposed to have in-plane magnetization, that is, the portion having no temperature rise, is also subjected to a great leakage magnetization. Consequently, it becomes difficult for the reproducing layer 1 to maintain a good front mask; thus, the CNR of sample #1 becomes lower than that of comparative sample #2. For the reasons as described above, it is required that the film thickness of the recording layer 4 be set from not less than 15 nm to not more than 180 nm.

In the above-mentioned example, $Gd_{0.20}(Fe_{0.84}Co_{0.16})_{0.80}$ is used as the reproducing layer 1, $(Gd_{0.10}Fe_{0.90})_{0.75}Al_{0.25}$ is used as the in-plane magnetization layer 2, and $Dy_{0.23}(Fe_{0.72}Co_{0.28})_{0.77}$ is used as the recording layer 4 in sample #1. The following description will show that a super-resolution reproducing operation can be achieved in the same manner as described above, even when materials and compositions other than those described above are adopted.

Table 5 shows the results of CNR measurements that were carried out as follows: In the construction of sample #1, supposing that the material of the reproducing layer 1 was $Gd_X(Fe_YCo_{1-Y})_{1-X}$, the values of X and Y were varied in the case of a mark length of 0.4 μm. In these measurements, with respect to individual samples in sample #1 each of which has a reproducing layer 1 having a different composition, recording is carried out with varied recording conditions so that the CNR has a maximum value when the reproducing power is set at 2.5 mW.

As can be seen from Table 5, in the range of $0.12 \leq X \leq 0.26$ and $0.60 \leq Y \leq 1.00$, the CNR shows higher values than the CNR (29.5 dB) of comparative sample #2 shown in the above-mentioned embodiment. Further, in the range of X<0.12, the total magnetization of the reproducing layer 1 decreases as the content of Gd decreases. For this reason, the portion of the reproducing layer 1 (the inside of the isothermal line 11 in FIG. 1), which has a temperature in the vicinity of the reproducing temperature, comes to have in-plane magnetization, resulting in degradation in the reproducing characteristic. Moreover, in the range of X>0.26, the compensation temperature of the reproducing layer 1 rises to the vicinity of the reproducing temperature, making the total magnetization of the reproducing layer 1 smaller. Consequently, the magnetostatic coupling force between the reproducing layer 1 and the recording layer 4 becomes smaller, thereby resulting in degradation in the reproducing characteristic. Furthermore, in the range of Y<0.6, the portion of the reproducing layer 1, which has a temperature in the vicinity of the reproducing temperature, comes to have in-plane magnetization as the content of Co increases, resulting in degradation in the reproducing characteristic.

For the reasons as described above, supposing that the composition of the reproducing layer 1 is $Gd_X(Fe_YCo_{1-Y})_{1-X}$, it is required that X and Y be set in the respective ranges of $0.12 \leq X \leq 0.26$ and $0.60 \leq Y \leq 1.00$.

TABLE 5

| X | Y | CNR (dB) |
|---|---|---|
| 0.10 | 0.84 | 19.5 |
| 0.12 | 0.84 | 30.0 |
| 0.14 | 0.84 | 31.0 |

TABLE 5-continued

| X | Y | CNR (dB) |
|---|---|---|
| 0.16 | 0.84 | 38.0 |
| 0.18 | 0.84 | 40.5 |
| 0.20 | 0.84 | 46.0 |
| 0.22 | 0.84 | 45.0 |
| 0.24 | 0.84 | 40.0 |
| 0.26 | 0.84 | 32.5 |
| 0.28 | 0.84 | 17.5 |
| 0.20 | 0.55 | 26.5 |
| 0.20 | 0.60 | 41.0 |
| 0.20 | 0.75 | 46.0 |
| 0.20 | 0.84 | 46.0 |
| 0.20 | 1.00 | 43.5 |

Table 6 shows the results of CNR measurements that were carried out as follows: In the construction of sample #1, supposing that the material of the in-plane magnetization layer 2 was $(Gd_XFe_{1-X})_YAl_{1-Y}$, the values of X and Y were varied in the case of a mark length of 0.4 μm. In these measurements, with respect to individual samples in sample #1 each of which has an in-plane magnetization layer 2 having a different composition, recording is carried out with varied recording conditions so that the CNR has a maximum value when the reproducing power is set at 2.5 mW. In this table, Curie temperatures in the respective compositions of the in-plane magnetization layers 2 are also listed.

As can be seen from Table 6, in the range of $0 \leq X \leq 0.14$ or $0.32 \leq X \leq 1.00$ and $0.30 \leq Y \leq 1.00$, the CNR shows higher values than the CNR (29.5 dB) of comparative sample #2. Further, in the range of 0.14<X<0.32, since the in-plane magnetization layer 2 comes to have perpendicular magnetization due to a reduction in the total magnetization of the in-plane magnetization layer 2, the reproducing layer 1 is not allowed to have in-plane magnetization. Moreover, in the range of Y<0.30, since the Curie temperature of the in-plane magnetization 2 decreases as the content of Al increases, the reproducing layer 1 is not allowed to have in-plane magnetization.

TABLE 6

| X | Y | CNR (dB) | Curie Temp. (°C.) |
|---|---|---|---|
| 0.00 | 0.75 | 30.5 | 220 |
| 0.05 | 0.75 | 41.0 | 160 |
| 0.10 | 0.75 | 46.0 | 140 |
| 0.14 | 0.75 | 39.0 | 130 |
| 0.18 | 0.75 | 20.0 | 125 |
| 0.25 | 0.75 | 20.5 | 120 |
| 0.29 | 0.75 | 19.5 | 110 |
| 0.32 | 0.75 | 32.5 | 110 |
| 0.40 | 0.75 | 39.0 | 105 |
| 0.70 | 0.75 | 45.0 | 105 |
| 0.90 | 0.75 | 44.0 | 100 |
| 1.00 | 0.75 | 42.0 | 100 |
| 0.10 | 0.25 | 23.5 | 35 |
| 0.10 | 0.30 | 33.5 | 60 |
| 0.10 | 0.50 | 43.5 | 100 |
| 0.10 | 0.75 | 46.0 | 140 |
| 0.10 | 1.00 | 44.5 | 200 |

For the reasons as described above, it is required that supposing that the composition of the in-plane magnetization layer 2 is $(Gd_XFe_{1-X})_YAl_{1-Y}$, the values of X and Y be set in the ranges of $0 \leq X \leq 0.14$ or $0.32 \leq X \leq 1.00$ and $0.30 \leq Y \leq 1.00$. Further, it is found that the Curie temperature of the in-plane magnetization layer 2 is required to be set from not less than 60° C. to not more than 220° C.

Moreover, materials other than GdFeAl may be used as the in-plane magnetization layer 2. Table 7 shows the results of CNR measurements that were carried out using a mark length of 0.4 μm in the construction of sample #1 in the case when $(Gd_{0.10}Fe_{0.90})_{0.75}Z_{0.25}$ is used as the material of the in-plane magnetization layer 2. Here, Ti, Ta, Pt, Au, Cu, $Al_{0.5}Ti_{0.5}$ and $Al_{0.5}Ta_{0.5}$ were used as Z. Moreover, the film thickness of the in-plane magnetization layer 2 was set to 20 nm. In these measurements, with respect to individual samples in sample #1 each of which has an in-plane magnetization layer 2 having a different composition, recording is carried out with varied recording conditions so that the CNR has a maximum value when the reproducing power is set at 2.5 mW. In this table, Curie temperatures in the respective compositions of the in-plane magnetization layers 2 are also listed. In any of the compositions shown in Table 7, the CNR which is higher than that of comparative sample #1 was obtained.

TABLE 7

| Z | CNR (dB) | Curie Temp. (°C.) |
|---|---|---|
| Ti | 46.5 | 115 |
| Ta | 45.5 | 110 |
| Pt | 46.0 | 125 |
| Au | 46.5 | 120 |
| Cu | 45.0 | 110 |
| $Al_{0.5}Ti_{0.5}$ | 45.5 | 125 |
| $Al_{0.5}Ta_{0.5}$ | 45.0 | 125 |

Tables 6 and 7 indicate that the in-plane magnetization layer 2 requires that its Curie temperature be set in the range of 60° C. to 220° C. Further, with respect to its material other than those described above, NdFeTi, NdFeTa, DyFeTi, DyFeTa, NdFe, NdFeAl, DyFe and DyFeAl may be used.

Table 8 shows the results of CNR measurements that were carried out as follows: In the construction of sample #1, supposing that the material of the recording layer 4 was $Dy_X(Fe_YCo_{1-Y})_{1-X}$, the values of X and Y were varied in the case of a mark length of 0.4 μm. In these measurements, with respect to individual samples in sample #1 each of which has a recording layer 4 having a different composition, recording is carried out with varied recording conditions so that the CNR has a maximum value when the reproducing power is set at 2.5 mW. Table 8 also shows the compensation temperatures and Curie temperatures of the respective compositions of the recording layer 4.

As can be seen from Table 8, in the range of 0.18≦X≦0.26 and 0.60≦Y≦0.90, the CNR shows higher values than the CNR (29.5 dB) of comparative sample #2.

In the range of X<0.18, the magnetization of the recording layer 4 at room temperature increases as the content of Dy decreases. For this reason, at room temperature, a greater leakage magnetic field is generated from the recording layer 4. Because of this leakage magnetic field, the reproducing layer 1 fails to form a good in-plane magnetization mask, thereby failing to achieve a super-resolution reproducing operation. In the range of X>0.26, the magnetization of the recording layer 4 becomes smaller, and the leakage magnetic field also becomes smaller. For this reason, the magnetization is not copied onto the reproducing layer 1, resulting in degradation in the CNR.

TABLE 8

| X | Y | CNR (dB) | Compensation Temp. (°C.) | Curie Temp. (°C.) |
|---|---|---|---|---|
| 0.16 | 0.72 | 20.5 | −150 | 300 |
| 0.18 | 0.72 | 41.0 | −100 | 290 |
| 0.23 | 0.72 | 46.0 | 25 | 275 |
| 0.26 | 0.72 | 42.5 | 60 | 260 |
| 0.28 | 0.72 | 21.5 | 100 | 245 |
| 0.23 | 0.50 | 25.5 | 25 | 380 |
| 0.23 | 0.60 | 39.5 | 25 | 320 |
| 0.23 | 0.72 | 46.0 | 25 | 275 |
| 0.23 | 0.81 | 42.5 | 25 | 215 |
| 0.23 | 0.90 | 32.5 | 25 | 160 |
| 0.23 | 0.95 | 22.0 | 25 | 120 |

Further, in the range of Y<0.60, the coercive force of the recording layer 4 comes to have an abrupt temperature dependence as the content of Co increases. For this reason, the coercive force of the recording layer 4 becomes too small in the vicinity of the reproducing temperature, it becomes difficult to maintain recorded information as it is. In the range of Y>0.90, the Curie temperature of the recording layer 4 decreases as the content of Co decreases. This makes the magnetization of the recording layer 4 small, resulting in a small leakage magnetic field that is generated by the recording layer 4. Therefore, the magnetization of the recording layer 4 is not copied onto the reproducing layer 1, resulting in degradation in the CNR.

As described above, in the case when $Dy_X(Fe_YCo_{1-Y})_{1-X}$ is used as the recording layer 4, it is required that the values of X and Y be set in the ranges of 0.18≦X≦0.26 and 0.60≦Y≦0.90. Moreover, when the compensation temperatures and Curie temperatures shown in Table 8 are taken into consideration, it is preferable to use a material having a compensation temperature from not less than −100° C. to not more than 60° C. and a Curie temperature from not less than 160° C. to not more than 320° C. as the recording layer 4. Therefore, it is possible to use alloys, such as TbFeCo, TbDyFeCo, GdDyFeCo, GdTbFeCo and GdTbDyFeCo, that satisfy the above-mentioned compensation temperature and Curie temperature.

As described above, in the reproducing method of a magneto-optical recording medium of the present embodiment, the magneto-optical recording medium has a reproducing layer constituted by a perpendicular magnetization film and a recording layer constituted by a perpendicular magnetization film that are magnetostatically coupled, an in-plane magnetization film is formed adjacent to the reproducing layer, and at a temperature not more than the Curie temperature of the in-plane magnetization film, the magnetization direction of the reproducing layer is changed from a perpendicular direction to an in-plane direction with respect to the film surface so as to form a mask upon reproducing information.

Moreover, in the magneto-optical recording medium of the present embodiment wherein a reproducing layer constituted by a perpendicular magnetization film and a recording layer constituted by a perpendicular magnetization film are magnetostatically coupled, an in-plane magnetization film is formed adjacent to the reproducing layer, the reproducing layer, which is made of an alloy of a rare-earth metal and a transition metal, has a composition having a greater transition-metal sublattice moment than the compensation composition at which the rare-earth sublattice moment balances the transition-metal sublattice moment at a temperature higher than room temperature, and at a temperature not more than the Curie temperature of the in-plane magnetization film, the magnetization direction of the reproducing layer is changed from a perpendicular direction to an in-plane direction with respect to the film surface so that the in-plane magnetization of the reproducing layer is used to form a mask upon reproducing information.

In accordance with the above-mentioned reproducing method and arrangement, the reproducing layer is allowed to have in-plane magnetization in a stable manner at portions thereof having no temperature rise so that it becomes possible to stably form a front mask using the in-plane magnetization mask, and also to provide a magnetic super-resolution reproducing operation that is free from inversion of the reproducing polarity upon reproducing.

[EMBODIMENT 2]

The following description will discuss the second embodiment of the present invention. Here, in the present embodiment, those members that have the same functions and that are described in embodiment 1 are indicated by the same reference numerals and the description thereof is omitted.

Figure 6:
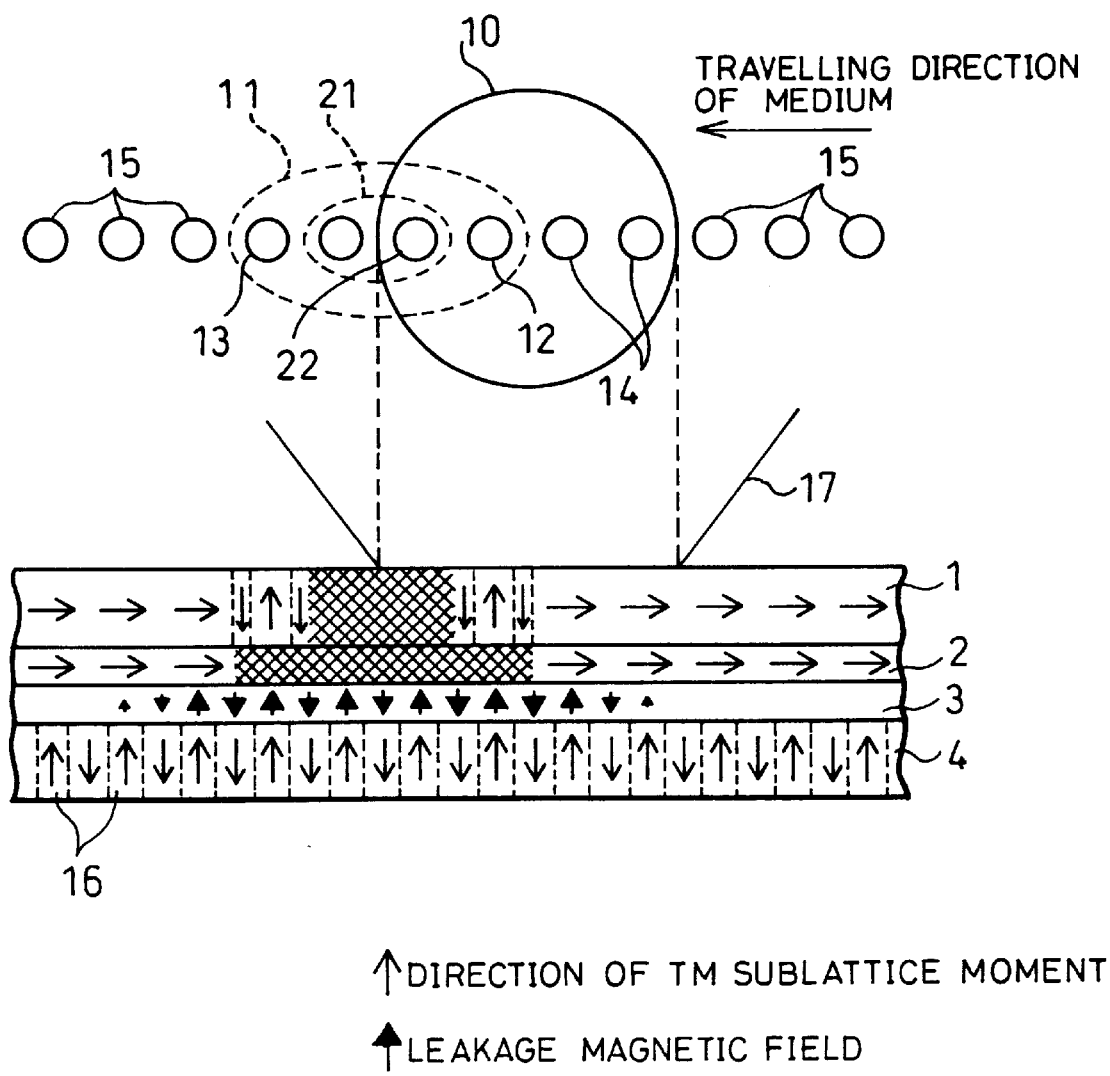
FIG. 6 is an explanatory drawing that shows a principle of reproducing used in a magneto-optical recording medium of Embodiment 2.

FIG. 6 is an explanatory drawing that shows a reproducing state in a magneto-optical recording medium (hereinafter, referred to as the present magneto-optical recording medium) of the present embodiment. The reproducing layer 1 of the present magneto-optical recording medium exhibits perpendicular magnetization if it exists alone, and changes its magnetic characteristic from a perpendicular magnetization state to an in-plane magnetization state at portions thereof that are exchange-coupled with the in-plane magnetization layer 2. For this reason, it is possible to adopt a perpendicular magnetization film that has a greater TM sublattice moment than the compensation composition as the reproducing layer 1.

In the same manner as a conventional super-resolution magneto-optical recording medium, in the present magneto-optical recording medium, magnetic domains are formed on the reproducing layer 1 and a super-resolution reproducing operation is achieved by reproducing these magnetic domains. Further, each of the reproducing layer 1 and the recording layer 4 has a composition having a greater TM sublattice moment than the compensation composition; therefore, the direction of the TM sublattice moment of the reproducing layer 1 and the direction of the TM sublattice moment of the recording layer 4 are parallel to each other. Since the reproducing polarity is not inverted, it is possible to readily provide compatibility with a conventional magneto-optical disk that only has a recording layer.

The above-mentioned arrangement and effects are in common with the magneto-optical disk described in Embodiment 1.

In addition to the above-mentioned arrangement, the present magneto-optical recording medium utilizes a region of the reproducing layer 1 that has been subjected to a temperature rise not less than the Curie temperature thereof as a rear mask (the second mask) that does not allow the magnetization of the recording layer to be copied. The region of the reproducing layer 1 that has been subjected to a temperature rise not less than the Curie temperature refers to a portion inside an iso-thermal line 21 in FIG. 6. Further, the Curie temperature of the reproducing layer 1 is set from not less than 160° C. to not more than 220° C.

With the above-mentioned arrangement, in the present magneto-optical recording medium, a portion of the reproducing layer 1 that exhibits in-plane magnetization (the outside of the iso-thermal line 11 shown in FIG. 6) is allowed to form a front mask, and the portion of the reproducing layer 1 that has been subjected to a temperature rise not less than the Curie temperature thereof (the inside of the iso-thermal line 21) is allowed to form a rear mask. Therefore, it is possible to achieve a super-resolution reproducing operation by the use of double masks.

Accordingly, although magnetic domain 22, among the magnetic domains of the reproducing layer 1 shown in FIG. 6, is located inside the iso-thermal line 11, and also located inside the light-beam spot 10, it is not subjected to a reproducing operation because of the rear mask. Only magnetic domain 12, which is located inside the light-beam spot 10, located inside the iso-thermal line 11 and also located outside the iso-thermal line 21, is subjected to the reproducing operation. Therefore, as illustrated in FIG. 6, even when recording magnetic domains, which are smaller than those shown in FIG. 1, are recorded with smaller pitches, a good super-resolution reproducing operation can be achieved.

The following description will discuss a magneto-optical disk (hereinafter, referred to as the present magneto-optical disk) that is an example of the present magneto-optical recording medium.

Figure 7:
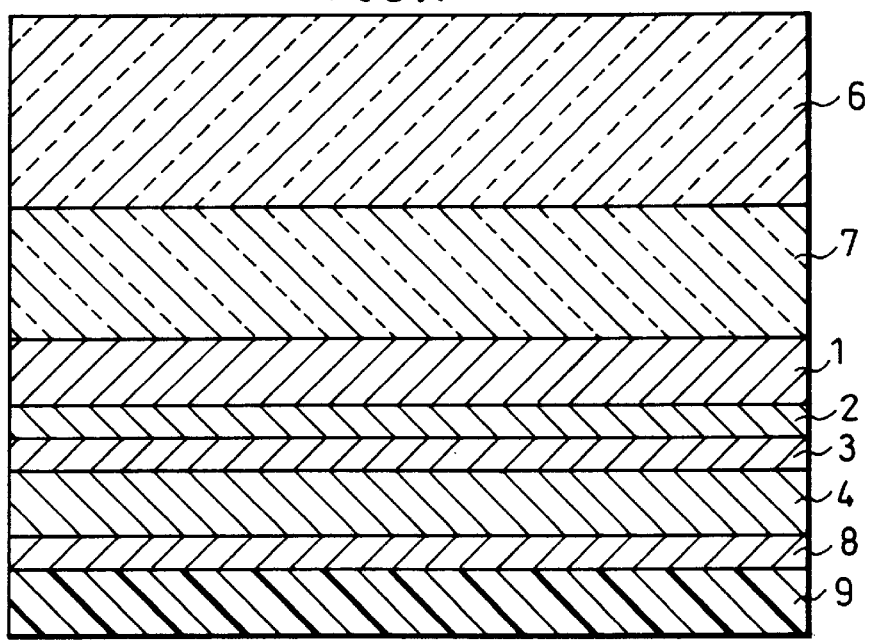
FIG. 7 is a cross-sectional view that schematically shows a construction of the magneto-optical disk of Embodiment 2.

As illustrated in FIG. 7, the present magneto-optical disk is constituted by a transparent dielectric layer 7, a reproducing layer 1, an in-plane magnetization layer 2, a non-magnetic intermediate layer 3, a recording layer 4, a protective layer 8 and an overcoat layer 9 that are stacked on a substrate 6 in this order. In other words, the present magneto-optical disk has the same construction as the magneto-optical disk shown in Embodiment 1.

In the present magneto-optical disk, the Curie temperature recording method is adopted as its recording method. In this method, a light beam, released from a semiconductor laser, is converged onto the reproducing layer 1 by an objective lens. Then, information is recorded and reproduced by a magneto-optical effect that is known as the polar Kerr effect. The polar Kerr effect refers to a phenomenon in which the direction of rotatory polarization in reflected light is reversed by magnetization that is aligned in the normal direction to the incident surface of a light beam.

The substrate 6, which is made of a transparent base material such as polycarbonate, is formed into a disk shape. The transparent dielectric layer 7 is preferably made from a material without containing oxygen, such as AlN, SiN and AlSiN. Further, the film thickness of the transparent dielectric layer 7 needs to be set so as to achieve a good interference effect with respect to an incident laser light beam and to increase the Kerr rotation angle. For this reason, supposing that the wavelength of reproducing light is $\lambda$ and that the refractive index of the transparent dielectric layer 7 is n, the film thickness of the transparent dielectric layer 7 needs to be set to approximately $\lambda/(4n)$. For example, in the case when the wavelength of laser beam is 680 nm, the film thickness of the transparent dielectric layer 7 is preferably set in the range of 40 nm to 100 nm.

The reproducing layer 1 is a magnetic layer made of a rare-earth transition-metal alloy. The composition of the reproducing layer 1 is set so as to contain a greater TM sublattice moment than the compensation composition. This arrangement is intended to prevent inversion of the reproducing polarity in the present magneto-optical disk from room temperature to the Curie temperature. Further, the reproducing layer 1 exhibits perpendicular magnetization with respect to the film surface when it exists alone. Moreover, the film thickness of the reproducing layer 1 is preferably set in the range of 12 nm to 80 nm in order to obtain a good reproducing signal. Furthermore, in order to achieve double masks in the reproducing layer 1, the Curie temperature of the reproducing layer 1 is set from not less than 160° C. to not more than 220° C.

The in-plane magnetization layer 2 exhibits in-plane magnetization up to the Curie temperature. Further, it has the characteristic of changing the magnetization direction of the reproducing layer 1 from a perpendicular direction to an in-plane direction through an exchange-coupling with the reproducing layer 1. Further, the Curie temperature of the in-plane magnetization layer 2 is preferably set at a temperature from not less than 60° C. to not more than 140° C. This arrangement is intended to provide a good in-plane magnetization mask in the reproducing layer 1 upon exchange-coupling with the reproducing layer 1. Moreover, the film thickness of the in-plane magnetization layer 2 is preferably set in the range of 2 nm to 60 nm in order to obtain a good reproducing signal.

The non-magnetic intermediate layer 3 is made of a dielectric material such as AlN, SiN and AlSiN, or a non-magnetic metal alloy made of elements such as Al, Ti and Ta. The film thickness of the non-magnetic intermediate layer 3 is set in the range of 1 nm to 60 nm so that the reproducing layer 1 and the recording layer 4 are magnetostatically coupled in a preferable manner. The recording layer 4 is made of a perpendicular magnetization film of a rare-earth transition-metal alloy. The film thickness of the recording layer 4 is set in the range of 15 nm to 200 nm so that a leakage magnetic field with a sufficient magnitude is exerted on the reproducing layer 1.

The protective layer 8 is made of a dielectric material such as AlN, SiN and AlSiN, or a non-magnetic metal alloy made of elements such as Al, Ti and Ta. The protective layer 8 is formed so as to prevent the rare-earth transition-metal alloys used in the reproducing layer 1 and the recording layer 4 from oxidation. The film thickness of the protective layer 8 is set in the range of 5 nm to 60 nm. The overcoat layer 9 is formed by applying ultraviolet-ray-setting resin or thermosetting resin through a spinner coating method and irradiating it with ultraviolet rays or applying heat to it.

(1) Formation Method of the Magneto-optical Disk

The following description will discuss a formation method of the present magneto-optical disk with the above-mentioned arrangement. The following formation method is one example of the formation method of the present magneto-optical disk. The present magneto-optical disk formed in this example is referred to as sample #2.

In a sputtering device having an Al target, a GdFeCo alloy target, a GdFeAl alloy target and a GdDyFeCo alloy target, a polycarbonate substrate 6, which has pregrooves and prepits and which is formed into a disk shape, was placed on a substrate holder. After the sputtering device had been evacuated to $1\times10^{-6}$ Torr, a mixed gas of argon and nitrogen was introduced thereto, and electric power was supplied to the Al target so that a transparent dielectric layer 7, made of AlN, was formed on the substrate 6 with a film thickness of 80 nm under a gas-pressure condition of $4\times10^{-3}$ Torr.

Next, after the sputtering device had been again evacuated to $1\times10^{-6}$ Torr, argon gas was introduced thereto, and electric power was supplied to the GdFeCo alloy target under a gas pressure of $4\times10^{-3}$ Torr so that a reproducing layer 1, made of $Gd_{0.16}(Fe_{0.95}Co_{0.05})_{0.84}$, was formed on the transparent dielectric layer 7 with a film thickness of 40 nm. The composition of the reproducing layer 1 was set so that it contains a greater TM sublattice moment than a RE sublattice moment at room temperature as compared with the compensation composition. Further, the reproducing layer 1 always exhibits perpendicular magnetization from room temperature to the Curie temperature (200° C.), if it exists alone.

Next, electric power was supplied to the GdFeAl target so that an in-plane magnetization layer 2, made of $(Gd_{0.39}Fe_{0.61})_{0.73}Al_{0.27}$, was formed on the reproducing layer 1 with a film thickness of 20 nm under a gas pressure of $4\times10^{-3}$ Torr. The in-plane magnetization film 2 exhibits in-plane magnetization from room temperature to the Curie temperature (110° C.).

Successively, a mixed gas of argon and nitrogen was introduced thereto, and electric power was supplied to the Al target so that a non-magnetic intermediate layer 3, made of AlN, was formed on the in-plane magnetization layer 2 with a film thickness of 5 nm under a gas-pressure condition of $4\times10^{-3}$ Torr.

Next, after the sputtering device had been again evacuated to $1\times10^{-6}$ Torr, argon gas was introduced thereto, and electric power was supplied to the GdDyFeCo alloy target under a gas pressure of $4\times10^{-3}$ Torr so that a recording layer 4, made of $(Gd_{0.50}Dy_{0.50})_{0.23}(Fe_{0.80}Co_{0.20})_{0.77}$, was formed on the non-magnetic intermediate layer 3 with a film thickness of 40 nm. The recording layer 4 has its compensation temperature at 25° C. and its Curie temperature at 275° C.

Successively, a mixed gas of argon and nitrogen was introduced thereto, and electric power was supplied to the Al target so that a protective layer 8, made of AlN, was formed on the recording layer 4 with a film thickness of 20 nm under a gas-pressure condition of $4\times10^{-3}$ Torr.

Next, ultraviolet-ray setting resin was applied to the protective layer 8 by a spinner coating method, and an overcoat layer 9 was formed by irradiation with ultraviolet rays.

Thus, sample #2 of the present magneto-optical disk was formed.

(2) Recording and Reproducing Characteristics

With respect to sample #2 of the present magneto-optical disk formed by the above-mentioned formation method (1), the mark-length dependence was measured on CNR (carrier-to-noise ratio). The measurements were carried out by using an optical pickup having a semiconductor laser with a wavelength of 680 nm. At this time, the laser power was set at 2.8 mW. The results of the measurements are shown in FIG. 8.

Figure 8:
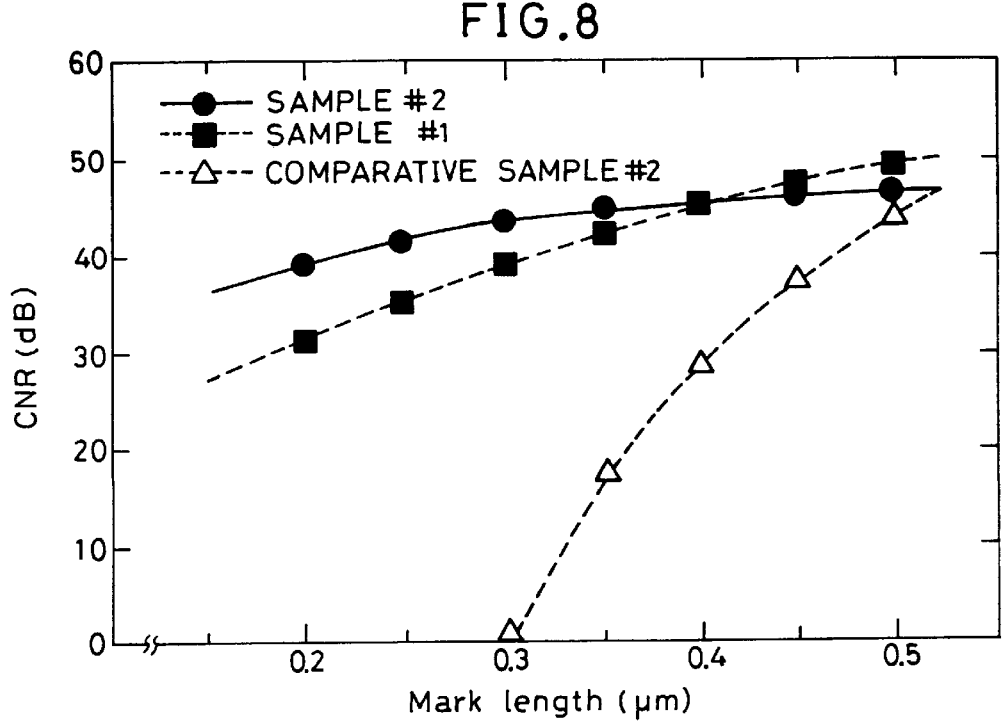
FIG. 8 is a graph that shows the mark-length dependence of CNR in the magneto-optical disk shown in FIG. 7.

For comparative purposes, FIG. 8 also shows the results of the measurements on sample #1 and comparative sample #2 shown in Embodiment 1. Moreover, the mark-length dependence of CNR shown in this Figure represents the carrier-to-noise ratio that is obtained as follows: Recording magnetic domains, each having a length corresponding to a mark length, are continuously formed with recording-magnetic-domain pitches each of which is double the mark length, and the carrier-to-noise ratio is obtained by reproducing these recording magnetic domains.

As shown in this Figure, in the case of short mark lengths, the CNR of sample #2 becomes higher than that of comparative sample #2. This indicates that a super-resolution reproducing operation is achieved in sample #2 in the same manner as sample #1. Further, in the case of mark lengths not less than 0.4 μm, the CNR of sample #1 becomes higher than the CNR of sample #2. This is due to the fact that since the Curie temperature of the reproducing layer 1 of sample #2 is lower than the Curie temperature of the reproducing layer 1 of sample #1, the reproducing signal becomes smaller.

In the case of mark lengths not more than 0.4 μm, the CNR of sample #2 becomes higher than the CNR of sample #1. This indicates that in sample #2, the above-mentioned double masks are achieved so that a super-resolution reproducing operation with a higher resolution has been achieved.

Thus, it is found that in order to achieve shorter mark lengths, that is, in order to achieve a greater recording density, sample #2 is more advantageous than sample #1.

Figure 9:
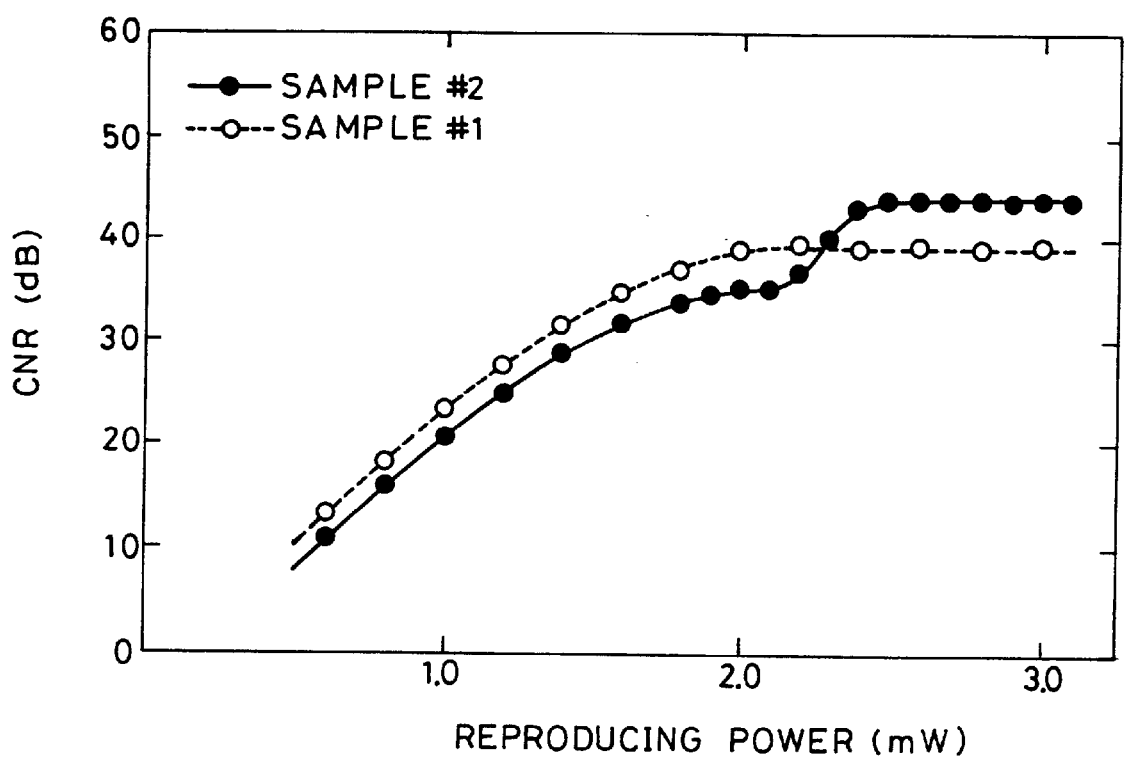
FIG. 9 is a graph that shows the reproducing-power dependence of CNR in the magneto-optical disks shown FIGS. 3 and 7.

Further, FIG. 9 is a graph that shows the reproducing-power dependence of CNR in the case of a mark length of 0.3 μm in sample #1 and sample #2. In sample #1, the CNR gradually increases as the reproducing power becomes higher, and attains a saturated state with a reproducing power not less than 2.0 mW. In contrast, in sample #2, a further increase in the CNR is observed even with a reproducing power in the vicinity of 2.2 mW. This indicates that in sample #2, the rear mask is formed with a reproducing power of not less than 2.0 mW and the formation of double masks is achieved.

Moreover, reproducing-signal waveforms, obtained in the present magneto-optical disk, are the same as those obtained in the magneto-optical disk shown in Embodiment 1. Therefore, unlike comparative sample #1 that is an example of the conventional medium shown in FIG. 2, the polarity of the reproducing signal is not inverted. Consequently, it is possible to obtain a reproducing signal that readily allows compatibility with comparative sample #2 that is a magneto-optical disk without a reproducing layer.

Table 9 shows the results of CNR measurements in the case when the film thickness of the reproducing layer 1 is varied in sample #2 with a mark length of 0.3 μm. In these measurements, with respect to individual samples in sample #2 each of which has a reproducing layer 1 having a different film thickness, recording is carried out with varied recording conditions so that the CNR has a maximum value when the reproducing power is set at 2.8 mW.

TABLE 9

| Film Thickness of Reproducing Layer (nm) | CNR (dB) | ΔCNR (dB) |
|---|---|---|
| 10 | 0 | — |
| 12 | 21.5 | 3.5 |
| 15 | 30.0 | 4.0 |
| 20 | 39.5 | 6.5 |
| 40 | 43.0 | 8.0 |
| 60 | 41.5 | 7.0 |
| 80 | 25.5 | 2.5 |
| 100 | 0 | — |

Moreover, as can be seen from the measurements of the reproducing power dependence of CNR shown in FIG. 9, in the present magneto-optical disk, an increase in the CNR is observed with a reproducing power of not less than 2.0 mW as a result of the formation of a rear mask. Accordingly, Table 9 shows ΔCNR which is the difference between the CNR with a reproducing power of 2.8 mW and the CNR with a reproducing power of 2.0 mW. If ΔCNR>0 holds, this means that a super-resolution reproducing operation by the use of the double masks described in the present embodiment is achieved.

As was shown in FIG. 8, in the case of a mark length of 0.3 μm, the CNR of comparative sample #2 becomes 0 dB, resulting in failure to provide a reproducing signal. In contrast, as shown in Table 9, in sample #2, a reproducing signal is detected when the film thickness of the reproducing layer 1 ranges from not less than 12 nm to not more than 80 nm, and the CNR that is greater than 0 exists. This indicates that a super-resolution reproducing operation is achieved in sample #2. Further, in the case of measurements with a mark length of 0.3 μm, ΔCNR>0 holds in all the ranges of film thickness in which CNR is obtained. Therefore, it is confirmed that a super-resolution reproducing operation by the use of the double masks described in the present embodiment is achieved.

Moreover, in the arrangement of sample #2, when the film thickness of the reproducing layer 1 is made thinner, most of the light beam, which has been directed thereto, passes through the reproducing layer 1, resulting in a reduction in the super-resolution reproducing effect. Further, the magnetostatic coupling force that is exerted between the reproducing layer 1 and the recording layer 4 becomes extremely small, making it impossible to obtain a sufficient magnetostatic coupling force. For this reason, when the film thickness of the reproducing layer 1 is set at a thin level of 10 nm in sample #2, the CNR becomes zero in the same manner as comparative sample #2, resulting in failure to provide a reproducing signal.

Moreover, when the film thickness of the reproducing layer 1 is set at a thick level of 100 nm in sample #2, a force which the reproducing layer 1 originally has and which is exerted to attain a perpendicularly magnetized state becomes greater. Consequently, the portion, which is supposed to have in-plane magnetization due to an exchange coupling with the in-plane magnetization layer 2, that is, the portion having no temperature rise, is made to exhibit perpendicular magnetization. Therefore, a good super-resolution reproducing operation is not obtained and the CNR becomes zero in the same manner as comparative sample #2, resulting in failure to provide a reproducing signal.

For the reasons as described above, it is required that the film thickness of the reproducing layer 1 be set from not less than 12 nm to not more than 80 nm.

Table 10 shows the results of CNR measurements in the case when the film thickness of the in-plane magnetization layer 2 is varied in sample #2 with a mark length of 0.3 μm. In these measurements, with respect to individual samples in sample #2 each of which has an in-plane magnetization 2 having a different film thickness, recording is carried out with varied recording conditions so that the CNR has a maximum value when the reproducing power is set at 2.8 mW.

Moreover, as can be seen from the measurements of the reproducing power dependence of CNR shown in FIG. 9, in the present magneto-optical disk, an increase in the CNR is observed with a reproducing power of not less than 2.0 mW as a result of the formation of a rear mask. Accordingly, Table 10 shows ΔCNR which is the difference between the CNR with a reproducing power of 2.8 mW and the CNR with a reproducing power of 2.0 mW. If ΔCNR>0 holds, this means that a super-resolution reproducing operation by the use of the double masks described in the present embodiment is achieved.

As was shown in FIG. 8, in the case of a mark length of 0.3 μm, the CNR of comparative sample #2 becomes 0 dB, resulting in failure to provide a reproducing signal. In contrast, as shown in Table 10, in sample #2, a reproducing signal is selected when the film thickness of the in-plane magnetization layer 2 ranges from not less than 2 nm to not more than 60 nm, and the CNR that is greater than 0 exists. This indicates that a super-resolution reproducing operation is achieved in sample #2.

TABLE 10

| Film Thickness of In-plain Mag. Layer (nm) | CNR (dB) | ΔCNR (dB) |
|---|---|---|
| 1 | 0 | — |
| 2 | 22.5 | 2.0 |

TABLE 10-continued

| Film Thickness of In-plain Mag. Layer (nm) | CNR (dB) | ΔCNR (dB) |
|---|---|---|
| 5 | 30.0 | 3.5 |
| 10 | 38.5 | 5.5 |
| 20 | 43.0 | 8.0 |
| 40 | 40.5 | 6.5 |
| 60 | 33.5 | 2.0 |
| 80 | 0 | — |

Further, in the case of measurements with a mark length of 0.3 μm, ΔCNR>0 holds in all the ranges of film thickness in which CNR is obtained. Therefore, it is confirmed that a super-resolution reproducing operation by the use of the double masks described in the present embodiment is achieved.

When the film thickness of the in-plane magnetization layer 2 is 1 nm, the value of CNR becomes 0 dB, resulting in failure to provide a reproducing signal. This is due to the fact that since the film thickness of the in-plane magnetization layer 2 is too thin, the reproducing layer 1 is not allowed to have in-plane magnetization. The magnetization of the reproducing layer 1, which originally exhibits in-plane magnetization, is made to exhibit perpendicular magnetization due to an exchange coupling with the in-plane magnetization layer 2. Therefore, in order to allow the reproducing layer 1 to have in-plane magnetization and also to achieve a super-resolution reproducing operation, it is required that the film thickness of the in-plane magnetization layer 2 be set not less than 2 nm.

Further, in the case of a film thickness of 80 nm in the in-plane magnetization layer 2, the CNR of sample #2 becomes 0 dB, resulting in failure to provide a reproducing signal. The magnetostatic coupling force exerted between the reproducing layer 1 and the recording layer 4 decreases as the film thickness of the in-plane magnetization layer 2 becomes thicker. For this reason, when the film thickness of the in-plane magnetization layer 2 is set at a thick level of 80 nm, it is difficult to obtain a magneto-static coupling force with a sufficient magnitude. In the case of sample #2, the Curie temperature of its reproducing layer 1 is set lower than that of sample #1. Consequently, the magnetization of the reproducing layer 1 becomes small, thereby resulting in a weak magnetostatic coupling force with the recording layer 4. For this reason, the upper limit of the film thickness of the in-plane magnetization layer 2 becomes smaller as compared with sample #1. For the reasons as described above, it is required that the film thickness of the in-plane magnetization layer 2 be set from not less than 2 nm to not more than 60 nm.

Table 11 shows the results of CNR measurements in the case when the film thickness of the non-magnetic intermediate layer 3 is varied in sample #2 with a mark length of 0.3 μm. In these measurements, with respect to individual samples in sample #2 each of which has a non-magnetic intermediate layer 3 having a different film thickness, recording is carried out with varied recording conditions so that the CNR has a maximum value when the reproducing power is set at 2.8 mW.

Moreover, as can be seen from the measurements of the reproducing power dependence of CNR shown in FIG. 9, in the present magneto-optical disk, an increase in the CNR is observed with a reproducing power of not less than 2.0 mW as a result of the formation of a rear mask. Accordingly, Table 11 shows ΔCNR which is the difference between the CNR with a reproducing power of 2.8 mW and the CNR with a reproducing power of 2.0 mW. If ΔCNR>0 holds, this means that a super-resolution reproducing operation by the use of the double masks described in the present embodiment is achieved.

TABLE 11

| Film Thickness of Non-Magnetic Int. Layer (nm) | CNR (dB) | ΔCNR (dB) |
|---|---|---|
| 0.5 | 0 | — |
| 1 | 42.5 | 8.0 |
| 5 | 43.0 | 8.0 |
| 10 | 42.0 | 8.0 |
| 20 | 39.5 | 7.0 |
| 40 | 31.0 | 5.5 |
| 60 | 24.5 | 3.0 |
| 80 | 0 | — |

In the case of a mark length of 0.3 μm, the CNR of comparative sample #2 becomes 0 dB, resulting in failure to provide a reproducing signal. In contrast, as shown in Table 11, in sample #2, a reproducing signal is detected when the film thickness of the non-magnetic intermediate layer 3 ranges from not less than 1 nm to not more than 60 nm, and the CNR that is greater than 0 exists. This indicates that a super-resolution reproducing operation is achieved in sample #2.

Further, in the case of measurements with a mark length of 0.3 μm, ΔCNR>0 holds in all the ranges of film thickness in which CNR is obtained. Therefore, it is confirmed that a super-resolution reproducing operation by the use of the double masks described in the present embodiment is achieved.

Moreover, as shown in Table 11, when the film thickness of the non-magnetic intermediate layer 3 is 0.5 nm, the value of CNR becomes 0 dB, resulting in failure to provide a reproducing signal. This is due to the fact that since the film thickness of the non-magnetic intermediate layer 3 is too thin, a good magnetostatic coupling state is not obtained. In order to obtain a good magnetostatic coupling state, it is required that the film thickness of the non-magnetic intermediate layer 3 be set at not less than 1 nm.

Further, in the case of a film thickness of 80 nm in the non-magnetic intermediate layer 3, the CNR becomes 0 dB, resulting in failure to provide a reproducing signal. This is due to the fact that the magnetostatic coupling force exerted between the reproducing layer 1 and the recording layer 4 decreases as the film thickness of the non-magnetic intermediate layer 3 becomes thicker. For this reason, when the film thickness of the non-magnetic intermediate layer 3 is set at a thick level of 100 nm, it is impossible to obtain a magnetostatic coupling force with a sufficient magnitude, resulting in failure to provide a reproducing signal. In the case of sample #2, since the Curie temperature of its reproducing layer 1 is set lower than that of sample #1, the magnetization of the reproducing layer 1 becomes small. Therefore, the magnetostatic coupling force between the reproducing layer 1 and the recording layer 4 becomes weak so that the upper limit of the film thickness of the non-magnetic intermediate layer 3 becomes smaller as compared with sample #1. For the reasons as described above, it is required that the film thickness of the non-magnetic intermediate layer 3 be set from not less than 1 nm to not more than 60 nm.

Table 12 shows the results of CNR measurements in the case when the film thickness of the recording layer 4 is varied in sample #2 with a mark length of 0.3 μm. In these measurements, with respect to individual samples in sample

2 each of which has a recording layer 4 having a different film thickness, recording is carried out with varied recording conditions so that the CNR has a maximum value when the reproducing power is set at 2.8 mW.

Moreover, as can be seen from the measurements of the reproducing power dependence of CNR shown in FIG. 9, in the present magneto-optical disk, an increase in the CNR is observed with a reproducing power of not less than 2.0 mW as a result of the formation of a rear mask. Accordingly, Table 12 shows $\Delta$CNR which is the difference between the CNR with a reproducing power of 2.8 mW and the CNR with a reproducing power of 2.0 mW. If $\Delta$CNR>0 holds, this means that a super-resolution reproducing operation by the use of the double masks described in the present embodiment is achieved.

In the case of a mark length of 0.3 µm, the CNR of comparative sample #2 becomes 0 dB, resulting in failure to provide any reproducing signal. In contrast, as shown in Table 12, in sample #2, a reproducing signal is detected when the film thickness of the recording layer 4 ranges from not less than 20 nm to not more than 200 nm, and the CNR that is greater than 0 exists. This indicates that a super-resolution reproducing operation is achieved in sample #2.

TABLE 12

| Film Thickness of Recording Layer (nm) | CNR (dB) | $\Delta$CNR (dB) |
|---|---|---|
| 15 | 0 | — |
| 20 | 38.5 | 4.0 |
| 40 | 43.0 | 6.5 |
| 80 | 42.5 | 8.0 |
| 120 | 40.5 | 5.5 |
| 160 | 33.5 | 4.0 |
| 200 | 21.0 | 1.5 |
| 240 | 0 | — |

Further, in the case of measurements with a mark length of 0.3 µm, $\Delta$CNR>0 holds in all the ranges of film thickness in which CNR is obtained. Therefore, it is confirmed that a super-resolution reproducing operation by the use of the double masks described in the present embodiment is achieved.

In the case when the film thickness of the recording layer 4 is set at a thin level of 15 nm, the CNR becomes 0 dB, resulting in failure to provide a reproducing signal. This is due to the fact that when the film thickness of the recording layer 4 is thin, a leakage magnetic field that is generated from the recording layer 4 becomes smaller, thereby failing to provide a magnetostatic coupling force with a sufficient magnitude in combination with the reproducing layer 1.

Further, when the film thickness of the recording layer 4 is set at a thick level of 240 nm, the CNR becomes zero, resulting in failure to provide a reproducing signal. This is due to the fact that the recording layer 4 has too great a leakage magnetic field. When the leakage magnetic field from the recording layer 4 is great, the portion of the reproducing layer 1, which is supposed to have in-plane magnetization, that is, the portion having no temperature rise, is also subjected to the great leakage magnetization. Consequently, it becomes difficult to form a good front mask, thereby failing to provide a reproducing signal. In the case of sample #2, the Curie temperature of its reproducing layer 1 has to be set lower than that of sample #1. For this reason, the magnetization of the reproducing layer 1 becomes smaller, and the magnetostatic coupling with the recording layer 4 becomes smaller. Therefore, the film thickness of the recording layer 4 has a different appropriate range as compared with sample #1.

Thus, the film thickness of the recording layer 4 is preferably set in the range of 20 nm to 200 nm.

In the above-mentioned example, $Gd_{0.16}(Fe_{0.95}Co_{0.05})_{0.84}$ is used as the reproducing layer 1, $(Gd_{0.39}Fe_{0.61})_{0.72}Al_{0.27}$ is used as the in-plane magnetization layer 2, and $(Gd_{0.50}Dy_{0.50})_{0.23}(Fe_{0.80}Co_{0.20})_{0.77}$ is used as the recording layer 4 in sample #2. The following description will show that a super-resolution reproducing operation can be achieved in the same manner as described above, even when materials and compositions other than those described above are adopted.

Table 13 shows the results of CNR measurements that were carried out as follows: In the construction of sample #2, supposing that the material of the reproducing layer 1 was $Gd_X(Fe_YCo_{1-Y})_{1-X}$, the values of X and Y were varied in the case of a mark length of 0.3 µm. In these measurements, with respect to individual samples in sample #2 each of which has a reproducing layer 1 having a different composition, recording is carried out with varied recording conditions so that the CNR has a maximum value when the reproducing power is set at 2.8 mW.

TABLE 13

| X | Y | CNR (dB) | $\Delta$CNR (dB) | Curie Temp. (°C.) |
|---|---|---|---|---|
| 0.10 | 0.95 | 0 | — | 190 |
| 0.12 | 0.95 | 35.5 | 8.5 | 195 |
| 0.14 | 0.95 | 40.5 | 9.0 | 195 |
| 0.16 | 0.95 | 43.0 | 9.0 | 200 |
| 0.18 | 0.95 | 40.0 | 4.5 | 220 |
| 0.20 | 0.95 | 39.0 | 0 | 235 |
| 0.16 | 0.80 | 38.5 | 0 | 230 |
| 0.16 | 0.85 | 40.5 | 4.0 | 220 |
| 0.16 | 0.90 | 41.5 | 7.5 | 215 |
| 0.16 | 0.95 | 43.0 | 9.0 | 200 |
| 0.16 | 1.00 | 42.5 | 9.0 | 190 |

Moreover, as can be seen from the measurements of the reproducing power dependence of CNR shown in FIG. 9, in the present magneto-optical disk, an increase in the CNR is observed with a reproducing power of not less than 2.0 mW as a result of the formation of a rear mask. Accordingly, Table 13 shows $\Delta$CNR which is the difference between the CNR with a reproducing power of 2.8 mW and the CNR with a reproducing power of 2.0 mW. If $\Delta$CNR>0 holds, this means that a super-resolution reproducing operation by the use of the double masks described in the present embodiment is achieved. Table 13 also shows Curie temperatures of the respective compositions of the reproducing layer 1.

As was shown in FIG. 8, in comparative sample #2, the CNR becomes zero in the case of a mark length of 0.3 µm, resulting in failure to provide a reproducing signal. In contrast, as can be seen from Table 13, the present magneto-optical disk provides CNRs not less than 0 in the range of $0.12 \leq X \leq 0.18$ and $0.85 \leq Y \leq 1.00$; this shows that greater CNRs are obtained as compared with comparative sample #2. In the range X<0.12, the CNR of the present magneto-optical disk becomes zero in the same manner as comparative sample #2. This is due to the fact that an increase in the total magnetization, resulted from a reduction in the content of Gd, causes the reproducing layer 1 to exhibit in-plane magnetization in the vicinity of the reproducing temperature (the inside of the iso-thermal line 11 in FIG. 6), making it unable to provide a reproducing signal.

Further, in the range X>0.18, CNRs greater than the CNR (0 dB) of comparative sample #2 are obtained. In this case, however, $\Delta$CNR becomes 0, resulting in failure to achieve a super-resolution reproducing operation which is a feature of the present magneto-optical disk. This is due to the fact that the Curie temperature increases as the content of Gd increases, that is, as X increases, with the result that no rear mask is formed (in the inside of the iso-thermal line 21 in FIG. 6). Similarly, in the range Y<0.85, although values greater than the CNR (0 dB) of comparative sample #2 are obtained, ΔCNR becomes 0. This is due to the fact that the Curie temperature increases as the content of Co increases with the result that no rear mask is formed. In other words, in order to achieve a super-resolution reproducing operation that is a feature of the present magneto-optical disk, supposing that the composition is $Gd_X(Fe_YCo_{1-Y})_{1-X}$, it is required that X and Y be set in the ranges of $0.12 \leq X \leq 0.18$ and $0.85 \leq Y \leq 1.00$. Moreover, according to the Table, the Curie temperature of the reproducing layer 1 needs to be set at least not more than 220° C.

Next, an explanation will be given of samples in which materials (GdFe, GdFeAl, GdFeTi, GdFeTa, GdFePt, GdFeAu, GdFeCu) other than GdFeCo are used. Table 14 shows compositions of the reproducing layer 1 used in the respective samples. Table 15 also shows the results of measurements of CNR and ΔCNR in the case of a mark length of 0.3 μm on samples #11 through #21 as well as Curie temperatures of the reproducing layer 1 of the respective samples #11 through #21.

TABLE 14

| Sample No. | Material of Recording Layer |
| --- | --- |
| #11 | $Gd_{0.16}Fe_{0.84}$ |
| #12 | $(Gd_{0.16}Fe_{0.84})_{0.95}Al_{0.05}$ |
| #13 | $(Gd_{0.16}Fe_{0.84})_{0.90}Al_{0.10}$ |
| #14 | $(Gd_{0.16}Fe_{0.84})_{0.85}Al_{0.15}$ |
| #15 | $(Gd_{0.16}Fe_{0.84})_{0.80}Al_{0.20}$ |
| #16 | $(Gd_{0.16}Fe_{0.84})_{0.75}Al_{0.25}$ |
| #17 | $(Gd_{0.16}Fe_{0.84})_{0.90}Ti_{0.10}$ |
| #18 | $(Gd_{0.16}Fe_{0.84})_{0.90}Ta_{0.10}$ |
| #19 | $(Gd_{0.16}Fe_{0.84})_{0.90}Pt_{0.10}$ |
| #20 | $(Gd_{0.16}Fe_{0.84})_{0.90}Au_{0.10}$ |
| #21 | $(Gd_{0.16}Fe_{0.84})_{0.90}Cu_{0.10}$ |

As shown in Table 15, in the case when $(Gd_{0.16}Fe_{0.84})_Y Al_{1-Y}$ is used as the reproducing layer 1, at Y=0.75, the CNR becomes 0, resulting in failure to achieve a super-resolution reproducing operation. This is due to the fact that the Curie temperature of the reproducing layer 1 becomes as low as 140° C., failing to achieve a good perpendicular magnetization state in the reproducing layer 1. In the case when $(Gd_{0.16}Fe_{0.84})_Y Al_{1-Y}$ is used as the reproducing layer 1, it is found that in the range $0.80 \leq Y \leq 1.00$, CNR>0 and ΔCNR>0 are satisfied so that a super-resolution reproducing operation that is a feature of the present magneto-optical recording medium can be achieved. Further, as can be seen from Table 15, it is required that the Curie temperature of the reproducing layer 1 be set at at least not less than 160° C.

Therefore, in order to achieve a super-resolution reproducing operation that is a feature of the present magneto-optical disk, it is required that the Curie temperature of the reproducing layer 1 be set from not less than 160° C. to not more than 220° C.

Moreover, as shown in Table 15, magnetic materials, such as GdFeTi, GdFeTa, GdFePt, GdFeAu and GdFeCu, whose Curie temperatures are set in this range of Curie temperature, can be used as the material of the reproducing layer 1.

Furthermore, besides the above-mentioned materials, magnetic materials, such as NdGdFe, NdGdFeCo, DyGdFe and DyGdFeCo, whose Curie temperatures are set from not less than 160° C. to not more than 220° C., may also be used as the material of the reproducing layer 1.

TABLE 15

| Sample No. | CNR (dB) | ΔCNR (dB) | Curie Temp. (°C.) |
| --- | --- | --- | --- |
| #11 | 42.5 | 9.0 | 190 |
| #12 | 41.5 | 7.5 | 185 |
| #13 | 39.0 | 4.5 | 180 |
| #14 | 38.5 | 4.0 | 175 |
| #15 | 35.5 | 2.5 | 160 |
| #16 | 0 | — | 140 |
| #17 | 39.5 | 5.5 | 195 |
| #18 | 39.0 | 5.5 | 180 |
| #19 | 38.0 | 4.5 | 175 |
| #20 | 39.0 | 5.0 | 185 |
| #21 | 38.5 | 4.5 | 180 |

Table 16 shows the results of CNR measurements that were carried out as follows: In the construction of sample #2, supposing that the material of the in-plane magnetization layer 2 was $(Gd_X Fe_{1-X})_Y Al_{1-Y}$, the values of X and Y were varied in the case of a mark length of 0.3 μm. Table 16 also shows ΔCNR and Curie temperatures in the respective compositions of the in-plane magnetization layer 2.

TABLE 16

| X | Y | CNR (dB) | ΔCNR (dB) | Curie Temp. (°C.) |
| --- | --- | --- | --- | --- |
| 0.00 | 0.73 | 0 | 0 | 225 |
| 0.05 | 0.73 | 0 | 0 | 160 |
| 0.10 | 0.73 | 29.5 | 5.0 | 140 |
| 0.14 | 0.73 | 33.0 | 5.5 | 130 |
| 0.18 | 0.73 | 0 | 0 | 125 |
| 0.25 | 0.73 | 0 | 0 | 120 |
| 0.29 | 0.73 | 0 | 0 | 120 |
| 0.33 | 0.73 | 29.5 | 3.5 | 120 |
| 0.36 | 0.73 | 35.5 | 5.5 | 115 |
| 0.39 | 0.73 | 43.0 | 9.0 | 110 |
| 0.50 | 0.73 | 40.5 | 5.5 | 105 |
| 0.75 | 0.73 | 39.0 | 4.0 | 105 |
| 1.00 | 0.73 | 35.5 | 3.5 | 100 |
| 0.39 | 0.28 | 0 | 0 | 40 |
| 0.39 | 0.35 | 31.5 | 3.5 | 60 |
| 0.39 | 0.53 | 40.5 | 7.0 | 100 |
| 0.39 | 0.73 | 43.0 | 9.0 | 110 |
| 0.39 | 0.95 | 35.5 | 6.5 | 140 |
| 0.39 | 1.00 | 0 | 0 | 160 |

As can be seen from Table 16, in the ranges of $0.10 \leq X \leq 0.14$ or $0.33 \leq X \leq 1.00$ and $0.35 \leq Y \leq 0.95$, CNR>0 and ΔCNR>0 are satisfied so that a super-resolution reproducing operation that is a feature of the present magneto-optical recording medium can be achieved. These composition ranges are determined based upon the same reasons as those described in the in-plane magnetization layer 2 of the magneto-optical disk shown in Embodiment 1. However, in the present magneto-optical disk, in order to achieve a super-resolution reproducing operation by the use of double masks, the Curie temperature of the reproducing layer 1 is set lower than that of the magneto-optical disk shown in Embodiment 1. Thus, the composition range of the in-plane magnetization layer 2 becomes narrower than that used in the magneto-optical disk shown in Embodiment 1.

Moreover, as can be seen from the Curie temperatures of Table 16, a super-resolution reproducing operation that is a feature of the present magneto-optical disk can be achieved in the case when the in-plane magnetization layer 2 has a Curie temperature in the range from not less than 60° C. to not more than 140° C.

Further, in the same manner as the magneto-optical disk shown in Embodiment 1, materials, such as GdFeTi, GdFeTa, GdFePt, GdFeAu, GdFeAlTi and GdFeAlTa, whose Curie temperature is set from not less than 60° C. to not more than 140° C., may be used as the in-plane magnetization layer 2.

Moreover, in the same manner as the magneto-optical disk shown in Embodiment 1, alloys, such as DyFeCo, TbFeCo, TbDyFeCo, GdDyFeCo, GdTbFeCo and GdTbDyFeCo, whose compensation temperature is set from not less than −100° C. to not more than 60° C. and whose Curie temperature is set from not less than 160° C. to not more than 320° C., may be used as the recording layer 4 of the present magneto-optical disk.

As described above, in the reproducing method of a magneto-optical recording medium of the present embodiment, the magneto-optical recording medium has a reproducing layer constituted by a perpendicular magnetization film and a recording layer constituted by a perpendicular magnetization film that are magnetostatically coupled, an in-plane magnetization film is formed adjacent to the reproducing layer, and at a temperature not more than the Curie temperature of the in-plane magnetization film, the magnetization direction of the reproducing layer is changed from a perpendicular direction to an in-plane direction with respect to the film surface so that upon reproducing information, the in-plane magnetization of the reproducing layer is allowed to form a first mask and a region of the reproducing layer having a temperature not more than the Curie temperature is allowed to form a second mask.

Moreover, in the magneto-optical recording medium of the present embodiment wherein a reproducing layer constituted by a perpendicular magnetization film and a recording layer constituted by a perpendicular magnetization film are magnetostatically coupled, an in-plane magnetization film is formed adjacent to the reproducing layer, the reproducing layer, which is made of an alloy of a rare-earth metal and a transition metal, has a composition having a greater transition-metal sublattice moment than the compensation composition at which the rare-earth sublattice moment balances the transition-metal sublattice moment, at a temperature higher than room temperature, and at a temperature not more than the Curie temperature of the in-plane magnetization film, the magnetization direction of the reproducing layer is changed from a perpendicular direction to an in-plane direction with respect to the film surface so that upon reproducing information, the in-plane magnetization of the reproducing layer is allowed to form a first mask and a region of the reproducing layer having a temperature not more than the Curie temperature is allowed to form a second mask.

In accordance with the above-mentioned reproducing method and arrangement, it is possible to provide a magnetic super-resolution reproducing operation that is free from inversion of the reproducing polarity and also to achieve a magnetic super-resolution reproducing operation using double masks; thus, it becomes possible to carry out a reproducing operation with superior resolving power.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:
   a reproducing layer constituted by a perpendicular magnetization film;
   a recording layer that is constituted by a perpendicular magnetization film and is magnetostatically coupled with the reproducing layer; and
   an in-plane magnetization layer that is interpolated between the reproducing layer and the recording layer and that changes the magnetization direction of the reproducing layer from a perpendicular direction to an in-plane direction with respect to the layer surface at a temperature not more than the Curie temperature.

2. The magneto-optical recording medium as defined in claim 1, wherein each of the reproducing layer and the recording layer is made of an alloy of a rare-earth metal and a transition metal, and has a composition whose transition-metal magnetic moment is greater than that of the compensation composition at which the rare-earth magnetic moment balances the transition-metal magnetic moment, at a temperature not less than room temperature.

3. The magneto-optical recording medium as defined in claim 1, wherein the in-plane magnetization layer is made of a material whose Curie temperature is set from not less than 60° C. to not more than 220° C.

4. The magneto-optical recording medium as defined in claim 3, wherein the in-plane magnetization layer is made of an alloy selected from the group consisting of: GdFe, GdFeAl, GdFeTi, GdFeTa, GdFePt, GdFeAu, GdFeCu, GdFeAlTi, GdFeAlTa, NdFeTi, NdFeTa, DyFeTi, DyFeTa, NdFe, NdFeAl, DyFe and DyFeAl.

5. The magneto-optical recording medium as defined in claim 3, wherein the in-plane magnetization-layer is made of an alloy represented by $(Gd_{X1}Fe_{1-X1})_{Y1}Al_{1-Y1}$, X1 and Y1 being in the ranges of $0.00 \leq X1 \leq 0.14$ or $0.32 \leq X1 \leq 1.00$ and $0.30 \leq Y1 \leq 1.00$.

6. The magneto-optical recording medium as defined in claim 3, wherein the recording layer is made of a rare-earth transition-metal alloy whose compensation temperature is in the range from not less than −100° C. to not more than 60° C. and whose Curie temperature is in the range from not less than 160° C. to not more than 320° C.

7. The magneto-optical recording medium as defined in claim 6, wherein the recording layer is made of an alloy selected from the group consisting of: DyFeCo, TbFeCo, TbDyFeCo, GdDyFeCo, GdTbFeCo and GdTbDyFeCo.

8. The magneto-optical recording medium as defined in claim 6, wherein the recording layer is made of an alloy represented by $Dy_{X2}(Fe_{Y2}Co_{1-Y2})_{1-X2}$, X2 and Y2 being in the ranges of $0.18 \leq X2 \leq 0.26$ and $0.60 \leq Y2 \leq 0.90$.

9. The magneto-optical recording medium as defined in claim 6, wherein the reproducing layer is represented by $Gd_{X3}(Fe_{Y3}Co_{1-Y3})_{1-}$, X3 and Y3 being in the ranges of $0.12 \leq X3 \leq 0.26$ and $0.60 \leq Y3 \leq 1.00$.

10. The magneto-optical recording medium as defined in claim 9, wherein the reproducing layer has a film thickness from not less than 10 nm to not more than 80 nm.

11. The magneto-optical recording medium as defined in claim 10, wherein the in-plane magnetization layer has a film thickness from not less than 2 nm to not more than 80 nm.

12. The magneto-optical recording medium as defined in claim 11, wherein the recording layer has a film thickness from not less than 15 nm to not more than 180 nm.

13. The magneto-optical recording medium as defined in claim 1, wherein the reproducing layer has a Curie temperature higher than that of the in-plane magnetization layer so the magnetization of the recording layer is not copied onto a portion thereof that has a temperature rise not less than said Curie temperature.

14. The magneto-optical recording medium as defined in claim 13, wherein the Curie temperature of the reproducing layer is set from not less than 160° C. to not more than 220° C. and the Curie temperature of the in-plane magnetization layer is set from not less than 60° C. to not more than 140° C.

15. The magneto-optical recording medium as defined in claim 14, wherein the reproducing layer is made of an alloy selected from the group consisting of: GdFe, GdFeCo, GdFeAl, GdFeTi, GdFeTa, GdFePt, GdFeAu, GdFeCu, NdGdFe, NeGdFeCo, DyGdFe and DyGdFeCo.

16. The magneto-optical recording medium as defined in claim 14, wherein the reproducing layer is made of an alloy represented by $Gd_{X4}(Fe_{Y4}Co_{1-Y4})_{1-X4}$, X4 and Y4 being in the ranges of $0.12 \leq X4 \leq 0.18$ and $0.85 \leq Y4 \leq 1.00$.

17. The magneto-optical recording medium as defined in claim 14, wherein the in-plane magnetization layer is made of an alloy represented by $(Gd_{X5}Fe_{1-X5})_{Y5}Al_{1-Y5}$, X5 and Y5 being in the ranges of $0.10 \leq X5 \leq 0.14$ or $0.33 \leq X5 \leq 1.00$ and $0.35 \leq Y5 \leq 0.95$.

18. The magneto-optical recording medium as defined in claim 17, wherein the reproducing layer has a film thickness from not less than 12 nm to not more than 80 nm.

19. The magneto-optical recording medium as defined in claim 18, wherein the in-plane magnetization layer has a film thickness from not less than 2 nm to not more than 60 nm.

20. The magneto-optical recording medium as defined in claim 19, wherein the recording layer has a film thickness from not less than 20 nm to not more than 200 nm.

21. A reproducing method for a magneto-optical recording medium that has a reproducing layer and a recording layer that are constituted perpendicular magnetization films and that are magnetostatically coupled with each other and an in-plane magnetization layer, comprising the step of:

at a portion of the reproducing layer corresponding to a portion of the in-plane magnetization layer that has a temperature not more than the Curie temperature, changing the magnetization of the portion from a perpendicular direction to an in-plane direction with respect to the layer surface so that the portion serves as a first mask that does not allow the magnetization of the recording layer to be copied.

22. The reproducing method for a magneto-optical recording medium as defined in claim 21, wherein: the reproducing layer has a Curie temperature that is higher than that of the in-plane magnetization layer, and a portion of the reproducing layer that has a temperature not less than the Curie temperature serves as a second mask that does not allow the magnetization of the recording layer to be copied.

23. The magneto-optical recording medium as defined in claim 1, wherein a row of recording magnetic domains for recording information are formed on the recording layer and wherein the in-plane magnetization layer comprises:

a high-temperature portion which, when the row of recording magnetic domains are scanned by a light beam, comes to have a temperature higher than a Curie temperature so a reproducing portion having perpendicular magnetization for copying the recording magnetic domains is formed on the reproducing layer, and a low-temperature portion which comes to have a temperature not more than the Curie temperature so a first mask portion for preventing the copying of the recording magnetic domains is formed on the reproducing layer in a manner so as to be aligned side by side with the reproducing portion in the scanning direction of the light beam.

24. The reproducing method for a magneto-optical recording medium as defined in claim 21, wherein a row of recording magnetic domains for recording information are formed on the recording layer and wherein the in-plane magnetization layer includes:

a high-temperature portion which, when the row of recording magnetic domains are scanned by a light beam, comes to have a temperature higher than a Curie temperature so a reproducing portion having perpendicular magnetization for copying the recording magnetic domains is formed on the reproducing layer, and a low-temperature portion which comes to have a temperature not more than the Curie temperature so a first mask portion for preventing the copying of the recording magnetic domains is formed on the reproducing layer in a manner so as to be aligned side by side with the reproducing portion in the scanning direction of the light beam.

25. The magneto-optical recording medium as defined In claim 1, wherein, when the in-plane magnetization layer has a temperature not more than the Curie temperature, the reproducing layer comes to exhibit in-plane magnetization through exchange coupling with the in-plane magnetization layer.

* * * * *